US012558766B2

(12) United States Patent
Kour et al.

(10) Patent No.: US 12,558,766 B2
(45) Date of Patent: Feb. 24, 2026

(54) PERCUSSION TOOL

(71) Applicant: MILWAUKEE ELECTRIC TOOL CORPORATION, Brookfield, WI (US)

(72) Inventors: Austin H. Kour, Saukville, WI (US); Andrew D. Van Hoorn, Menomonee Falls, WI (US); Randall J. Klotka, Grafton, WI (US); Taylor Crabb, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/356,037

(22) Filed: Jul. 20, 2023

(65) Prior Publication Data

US 2024/0042589 A1 Feb. 8, 2024

Related U.S. Application Data

(60) Provisional application No. 63/383,820, filed on Nov. 15, 2022, provisional application No. 63/394,413, filed on Aug. 2, 2022.

(51) Int. Cl.
*B25D 11/12* (2006.01)

(52) U.S. Cl.
CPC ...... *B25D 11/12* (2013.01); *B25D 2217/0061* (2013.01); *B25D 2217/0073* (2013.01); (Continued)

(58) Field of Classification Search
None
See application file for complete search history.

(56) References Cited

U.S. PATENT DOCUMENTS 4,489,261 A 12/1984 Hartwig et al.
6,325,157 B1 12/2001 Arakawa et al.
(Continued)

FOREIGN PATENT DOCUMENTS

CN 201098887 Y 8/2008
CN 206029788 U 3/2017
(Continued)

OTHER PUBLICATIONS

Milwaukee Tool, "10 KG Class SDS-MAX Breaking Hammer," <https://www.milwaukeetool.eu/en-eu/10-kg-class-sds-max-breaking-hammer/k-1000-s/> web page visited Aug. 1, 2023 (4 pages).
(Continued)

*Primary Examiner* — Tanzim Imam
(74) *Attorney, Agent, or Firm* — Quarles & Brady LLP

(57) ABSTRACT

A percussion tool includes a housing having a top end, a bottom end, a front end, and a rear end. The housing defines a barrel portion, a handle portion opposite the barrel portion, and a motor housing portion between the barrel portion and the handle portion. The percussion tool also includes an electric motor positioned within the motor housing portion and a percussion mechanism driven by the motor and including a striker supported for reciprocation in the housing. The striker defines a striker axis in a reciprocating direction. The percussion tool further includes a battery receptacle supported by the housing and a battery pack removably coupled to the battery receptacle for providing power to the motor. The battery pack and the battery receptacle define a battery axis extending longitudinally through the battery pack and battery receptacle. The striker axis and the battery axis are parallel.

25 Claims, 23 Drawing Sheets

(52) U.S. Cl.
CPC .. *B25D 2250/095* (2013.01); *B25D 2250/121* (2013.01); *B25D 2250/371* (2013.01)

(56) References Cited

U.S. PATENT DOCUMENTS

| | | | |
|---|---|---|---|
| 9,673,738 | B2 | 6/2017 | Miller et al. |
| 10,076,833 | B2 | 9/2018 | Tada et al. |
| 10,562,167 | B2 | 2/2020 | Takeuchi et al. |
| 10,688,644 | B2 | 6/2020 | Iida et al. |
| 10,751,809 | B2 | 8/2020 | Nagasaka et al. |
| 10,875,168 | B2 | 12/2020 | Iida et al. |
| 10,888,989 | B2 | 1/2021 | Kawakami et al. |
| 11,052,531 | B2 | 7/2021 | Baxivanelis et al. |
| 11,148,272 | B2 | 10/2021 | Yoshikane et al. |
| 2009/0038815 | A1 | 2/2009 | Lin et al. |
| 2015/0328763 | A1 | 11/2015 | Ito et al. |
| 2015/0328764 | A1 | 11/2015 | Yoshikane et al. |
| 2016/0181891 | A1* | 6/2016 | Fogle .................. H02K 1/2791 310/43 |
| 2018/0099393 | A1* | 4/2018 | Iida ........................ B25D 17/24 |
| 2019/0028003 | A1 | 1/2019 | Seith et al. |
| 2020/0306945 | A1 | 10/2020 | Yoshikane et al. |
| 2021/0402584 | A1 | 12/2021 | Yoshikane et al. |

FOREIGN PATENT DOCUMENTS

| | | | | |
|---|---|---|---|---|
| CN | 206029789 | U | 3/2017 | |
| CN | 110625574 | A | 12/2019 | |
| CN | 211565775 | U | 9/2020 | |
| CN | 213616503 | U | 7/2021 | |
| CN | 213673950 | U | 7/2021 | |
| CN | 214187040 | U | 9/2021 | |
| CN | 214352208 | U | 10/2021 | |
| DE | 4317002 | A1 | 11/1994 | |
| DE | 202014000409 | U1 | 1/2014 | |
| DE | 102013202027 | A1 | 8/2014 | |
| DE | 112014000645 | T5 | 11/2015 | |
| DE | 102015226415 | A1 | 6/2017 | |
| EP | 0499459 | A2 | 8/1992 | |
| EP | 1240976 | A1 | 9/2002 | |
| GB | 2320818 | A * | 7/1998 | ............. H02K 5/207 |
| JP | 2016165784 | A | 9/2016 | |
| JP | 2019096417 | A | 6/2019 | |
| WO | 2017108414 | A1 | 6/2017 | |
| WO | 2018225379 | A1 | 12/2018 | |
| WO | 2021036095 | A1 | 3/2021 | |
| WO | 2021175652 | A1 | 9/2021 | |
| WO | 2021202968 | A1 | 10/2021 | |
| WO | 2022017846 | A1 | 1/2022 | |

OTHER PUBLICATIONS

Makita, "80V max (40V max X2) XGT® Brushless 28 lb. SDS-MAX AVT® Demolition Hammer, AWS® Capable, Tool Only," <https://www.makitatools.com/products/details/GMH02Z> web page visited Aug. 1, 2023 (2 pages).

Extended European Search Report for Application No. 23187955.2 dated Jan. 4, 2024 (22 pages).

* cited by examiner

PERCUSSION TOOL

CROSS-REFERENCE TO RELATED APPLICATIONS

This application claims priority to U.S. Provisional Patent Application No. 63/383,820 filed Nov. 15, 2022 and U.S. Provisional Patent Application No. 63/394,413 filed on Aug. 2, 2022, and the entire contents of both of which are incorporated herein by reference.

FIELD OF THE INVENTION

The present disclosure relates to power tools, and more particularly to percussion tools.

BACKGROUND OF THE INVENTION

Percussion tools, such as breakers or demolition hammers, impart axial impacts to an attached chisel to demolish a work surface. Percussion tools may be powered by an AC or DC power source.

SUMMARY OF THE INVENTION

The present disclosure, in one aspect, provides a percussion tool including a housing having a top end, a bottom end, a front end, and a rear end. The housing defines a barrel portion, a handle portion opposite the barrel portion, and a motor housing portion between the barrel portion and the handle portion. The percussion tool also includes an electric motor positioned within the motor housing portion and a percussion mechanism driven by the motor and including a striker supported for reciprocation in the housing. The striker defines a striker axis in a reciprocating direction. The percussion tool further includes a battery receptacle supported by the housing and a battery pack removably coupled to the battery receptacle for providing power to the motor. The battery pack and the battery receptacle define a battery axis extending longitudinally through the battery pack and battery receptacle. The striker axis and the battery axis are parallel.

The present disclosure, in still another aspect, provides a percussion tool having a housing, an electric motor positioned within the housing, a percussion mechanism driven by the motor and including a striker supported for reciprocation in the housing, the striker defining a striker axis in a reciprocating direction, a battery receptacle supported by the housing, a battery pack removably coupled to the battery receptacle for providing power to the motor, a controller operably coupled with the electric motor, and an air baffle disposed between the controller and the electric motor, wherein the air baffle directs air flow between the controller and the electric motor.

The present disclosure provides, in another aspect, a percussion tool including a housing, an electric motor positioned within the housing, and a percussion mechanism driven by the motor and including a striker supported for reciprocation in the housing. The striker defines a striker axis in a reciprocating direction. The percussion tool also includes a battery receptacle supported by the housing and a battery pack removably coupled to the battery receptacle for providing power to the motor. The battery pack and the battery receptacle define a battery axis extending longitudinally through the battery pack and battery receptacle. The battery axis forms an oblique angle with the striker axis.

The present disclosure, in another aspect, provides a percussion tool including a housing having a top end, a bottom end, a front end, and a rear end. The housing defines a barrel portion, a handle portion opposite the barrel portion, and a motor housing portion between the barrel portion and the handle portion. The percussion tool also includes an electric motor positioned within the motor housing portion and a percussion mechanism driven by the motor and including a striker supported for reciprocation in the housing. The striker defines a striker axis in a reciprocating direction. The percussion tool further includes a battery receptacle supported by the housing and a battery pack removably coupled to the battery receptacle for providing power to the motor. The battery pack and the battery receptacle define a battery axis extending longitudinally through the battery pack and battery receptacle. The striker axis and the battery axis are perpendicular.

The present disclosure, in another aspect, provides a system including a percussion tool having a housing, an electric motor supported by the housing, a percussion mechanism driven by the motor and including a striker supported for reciprocation in the housing, and a first battery receptacle supported on the housing operable to receive a battery pack. The system also includes a remote power unit having a second battery receptacle operable to receive a battery pack, and a cord including a first end coupled to the second battery receptacle and a second end including a connector configured to engage the first battery receptacle. The system further includes a battery pack alternatively coupled to the first and second battery receptacles to provide power to the motor.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. In addition, as used herein, the terms “front”, “rear”, “upper”, “lower”, “top”, “bottom”, “left”, “right”, and other directional terms are not intended to require any particular orientation, but are instead used for purposes of description only.

DETAILED DESCRIPTION

Figure 1:
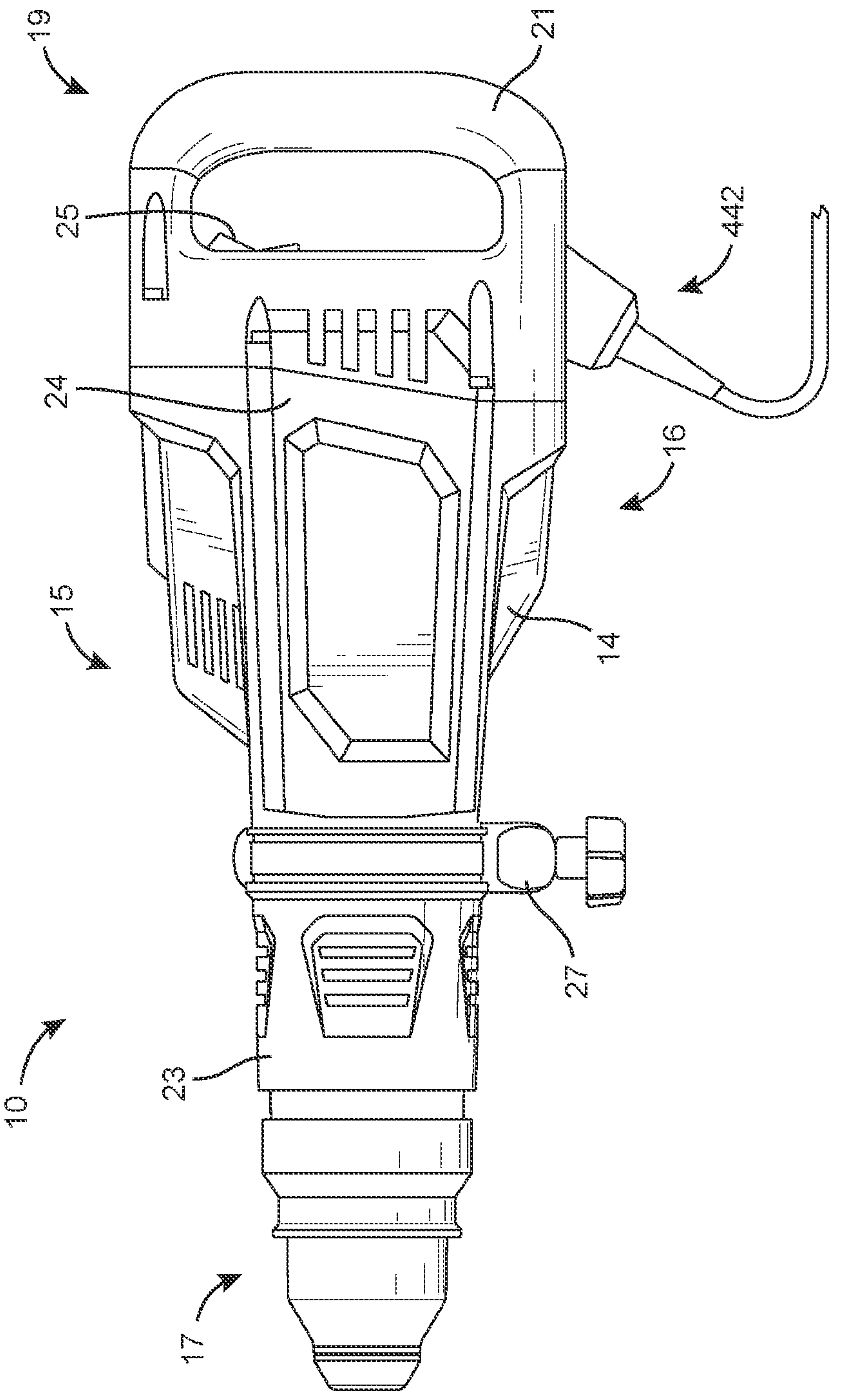
FIG. 1 is a plan view of a percussion tool in accordance with an embodiment of the invention.
Figure 2:
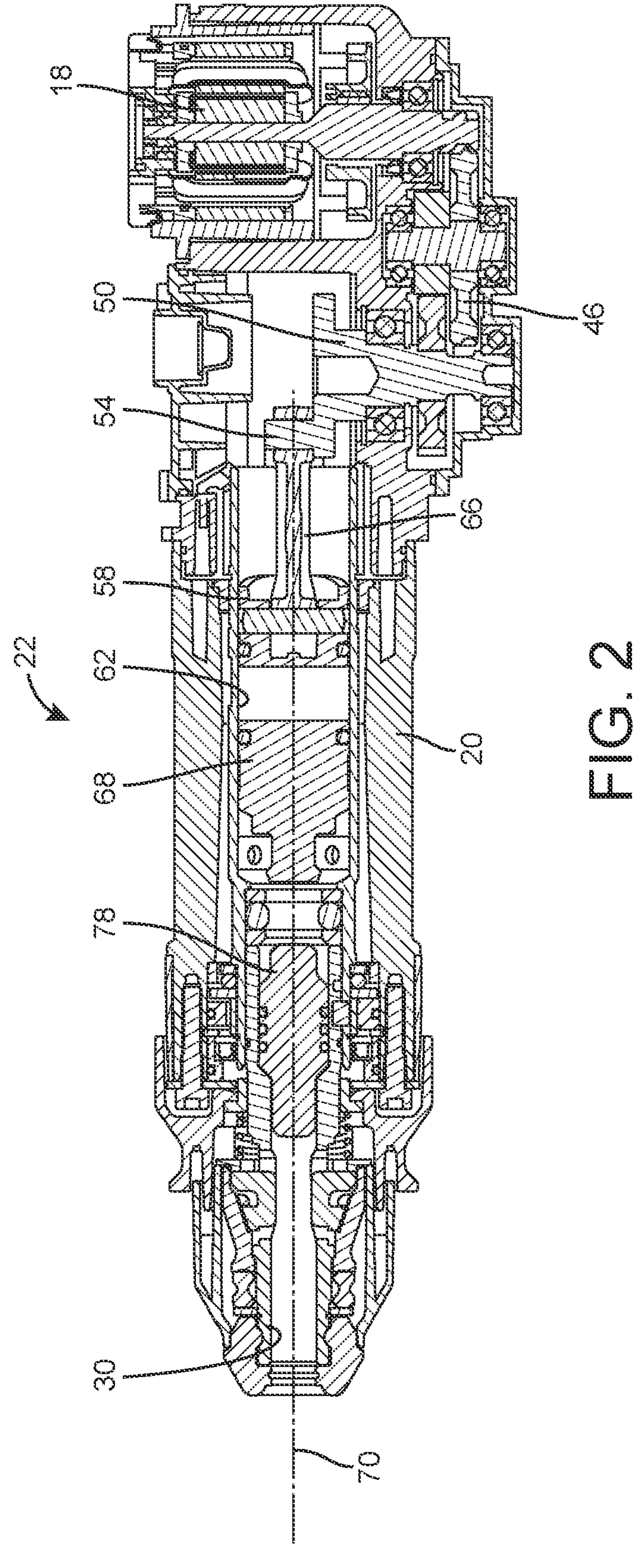
FIG. 2 is a cross-sectional view of the percussion tool of FIG. 1 illustrating a percussion mechanism.

FIG. 1 illustrates a percussion tool such as a demolition hammer 10, according to an embodiment of the invention. The demolition hammer 10 includes a housing 14, a brushless electric motor 18 supported within a crank case 20 (FIG. 2), and a percussion mechanism 22 driven by the motor 18 to impart repeated percussive impacts on a surface or workpiece via a chisel or other tool accessory (not shown) supported within a tool holder 30 (FIG. 2). The housing 14 includes a top end 15, a bottom end 16, a front side 17, and a rear side 19 behind which the operator stands to operate the demolition hammer 10. The housing 14 defines a handle portion 21 adjacent the rear side 19, a barrel 23 adjacent the front side 17, and a gear/motor housing portion 24 extending between the handle portion 21 and the barrel 23. A trigger 25 is positioned adjacent the handle portion 21 to selectively activate the motor 18. In the illustrated embodiment, the demolition hammer 10 includes an auxiliary handle 27 selectively coupled to the barrel 23 to assist a user during operation.

In the illustrated embodiment, the demolition hammer 10 is operable to be powered by a DC power source as will be described in more detail below. In other embodiments, the demolition hammer 10 may be powered by AC power source such as from a power cord or other source. For example, the demolition hammer 10 may include a battery pack 26 (FIG. 4) that is attachable to the housing 14 and configured to provide electrical power to the motor 18. The battery pack 26 may include any of a number of different nominal voltages (e.g., 12V, 18V, 80V, etc.), and may be configured having any of a number of different chemistries (e.g., lithium-ion, nickel-cadmium, etc.). In the illustrated embodiment, the battery pack 26 includes a battery pack housing 28 and a plurality of individual battery cells (not shown) within the battery pack housing 28. The battery pack 26 is receivable in a battery receptacle 34 that is coupled to the housing 14. The battery pack 26 and the battery receptacle 34 define a battery axis 38 that extends the longitudinal length of the battery pack 26 and the battery receptacle 34. In general, the battery axis 38 defines the direction in which the battery pack 26 is coupled to the battery receptacle 34. The battery pack 26 is removable from the battery receptacle 34 for attachment to a remote charging station. The demolition hammer 10 further includes a controller 40 (FIG. 5B) for activating and deactivating the motor 18 in response to user input.

With reference to FIG. 2, the demolition hammer 10 also includes a gear train 46 rotationally supported by the crank case 20 for transmitting torque from the motor 18 to the percussion mechanism 22. In some embodiments, the gear train 46 may be considered part of the percussion mechanism 22. The percussion mechanism 22 includes a crank shaft 50 having an eccentric pin 54, a reciprocating piston 58 disposed within a cylinder 62, and a connecting rod 66 interconnecting the piston 58 and the eccentric pin 54. The percussion mechanism 22 also includes a striker 68 that is selectively reciprocable within the cylinder 62 in response to reciprocation of the piston 58. The striker 68 defines a striker axis 70 along which the striker 68 is configured to impart repeated axial impacts to the chisel in the tool holder 30 in response to reciprocation of the piston 58. An anvil 78 may optionally be positioned between the striker 68 and the chisel to transmit the axial impacts from the striker 68 to the chisel.

Figure 3:
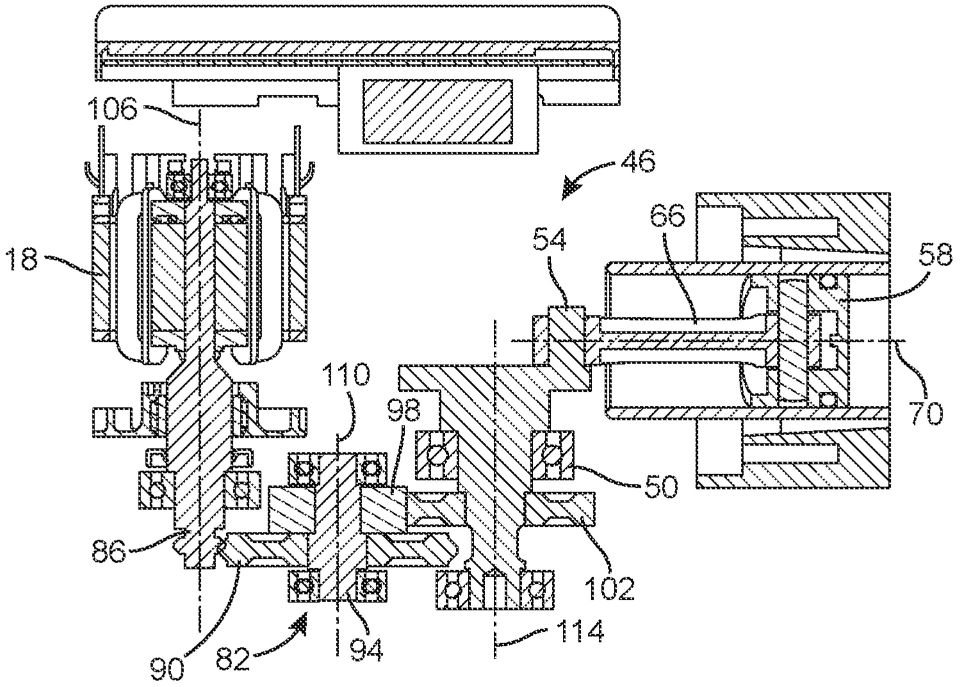
FIG. 3 is a plan view of a gear train of the percussion mechanism of FIG. 2.

With reference to FIG. 3, the gear train 46 includes an idler gear assembly 82 disposed between the crank shaft 50 and an output shaft 86 of the motor 18. The output shaft 86 is coupled to a first gear 90 on an idler shaft 94. A second gear 98 disposed about the idler shaft 94 is meshed with a third gear 102 supported on the crank shaft 50. Rotation of the output shaft 86 is transferred to the idler shaft 94 and then to the crank shaft 50. The output shaft 86, the idler shaft 94, and the crank shaft 50 define rotational axes 106, 110, 114, respectively. The rotational axes 106, 110, 114 are all parallel to one another. In addition, the rotational axes 106, 110, 114 are all perpendicular to the striker axis 70. The output shaft 86 of the motor 18 extends from the motor 18 in a direction towards the bottom end 16 of the housing 14. It should be noted that the percussion mechanism 22 only imparts axial impacts to the chisel and does not rotate the chisel or other tool accessory. In other embodiments, the demolition hammer 10 may include a spindle and a transmission to transfer torque from the motor 18 to the spindle to rotate the spindle.

The illustrated demolition hammer 10 is lighter comparatively to other percussion tools. For example, the demolition hammer 10 is lighter than breakers. The demolition hammer 10 may weigh between 20 pounds and 30 pounds. In some embodiments, the demolition hammer 10 may weigh approximately 25 pounds. In further embodiments, the demolition hammer 10 weighs less than 30 pounds. The light weight of the demolition hammer 10 allows the user to easily use the percussion tool 10 in a horizontal orientation to, for example, break down concrete walls. The light weight of the demolition hammer 10 also allows a user to easily carry the demolition hammer 10 between operations without assistance.

Figure 4:
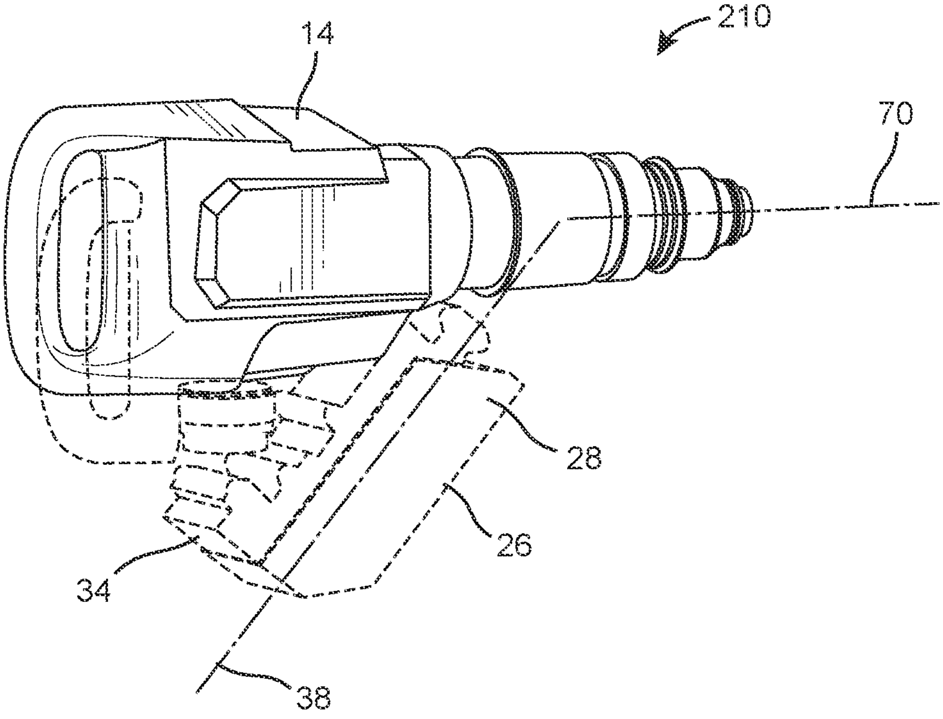
FIG. 4 is a perspective view of a percussion tool according to another embodiment.
Figure 5A:
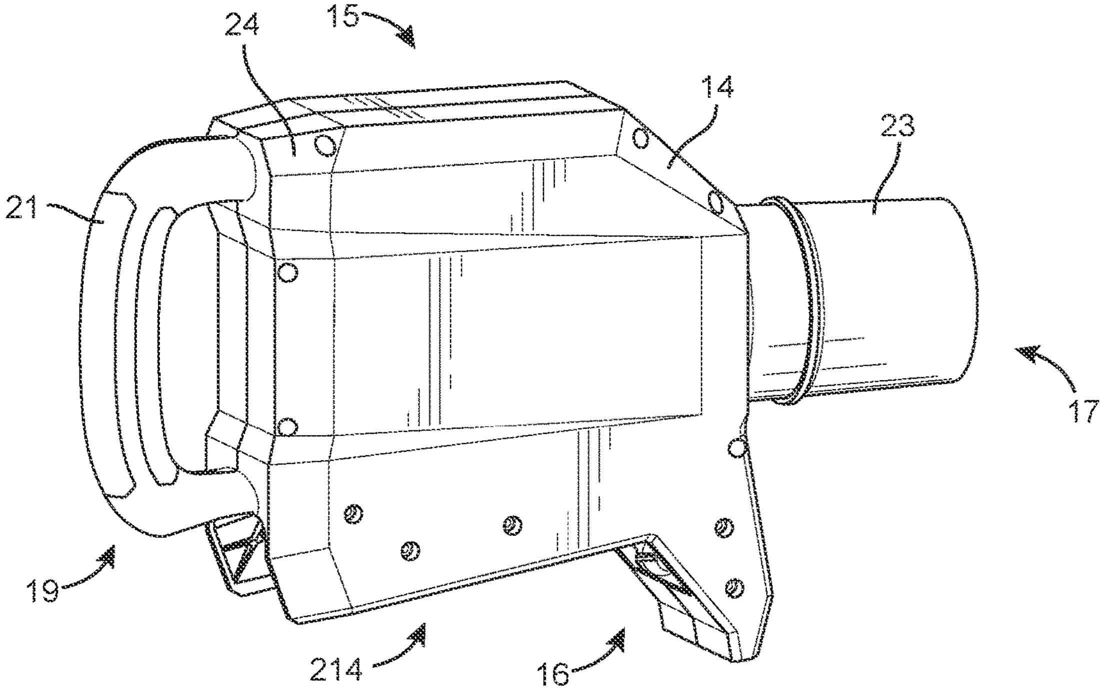
FIG. 5A is a perspective view of a housing of the percussion tool of FIG. 4.
Figure 5B:
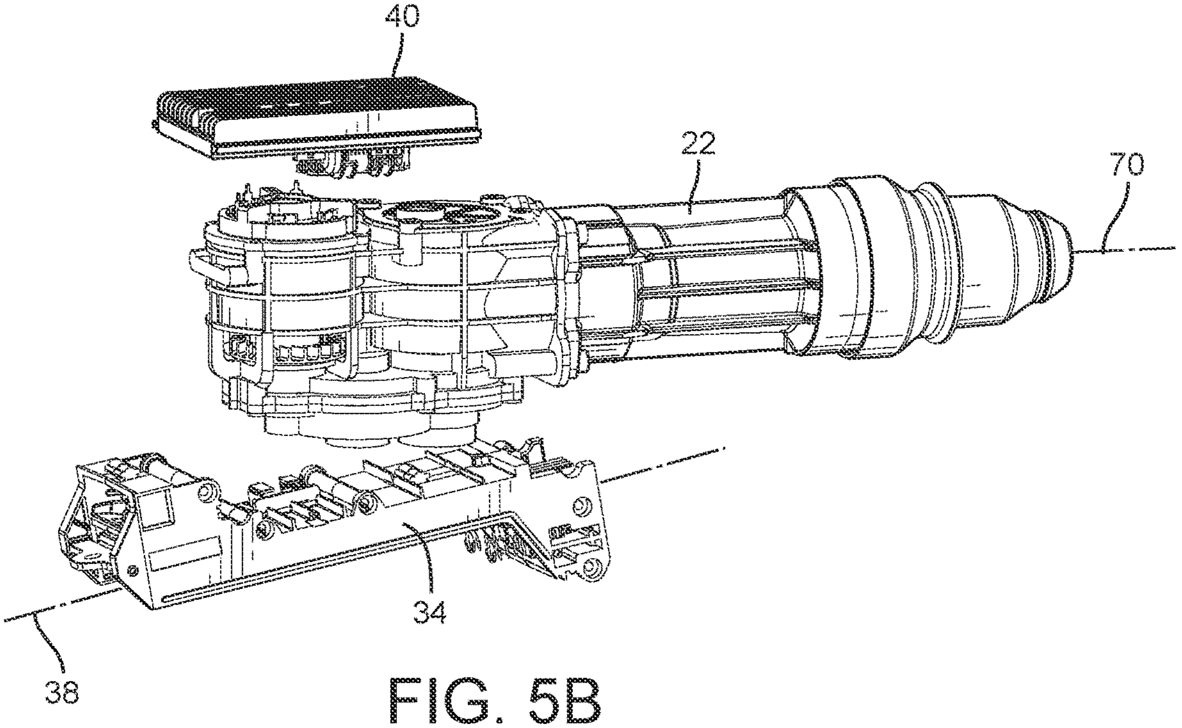
FIG. 5B is a perspective view of the percussion tool of FIG. 4 with the housing removed.

FIG. 4 illustrates a demolition hammer 210 according to another embodiment of the invention. The demolition hammer 210 is similar to the demolition hammer 10 discussed above with like features being represented with like reference numbers. The demolition hammer 210 includes the housing 14, a battery receptacle 34 to receive the battery pack 26, and the percussion mechanism 22 discussed above. As shown in FIG. 5A, the bottom end 16 of the housing 14 defines an opening 214 to receive the battery receptacle 34, the controller 40, and the percussion mechanism 22 (FIG. 5B). As shown in FIG. 5B, when positioned in the housing 14, the controller 40 is positioned adjacent the top end 15 of the housing 14 above the percussion mechanism 22. In the illustrated embodiment, the battery receptacle 34 is positioned on the bottom end 16 of the gear/motor housing portion 24 underneath the percussion mechanism 22. The battery receptacle 34 receives the battery pack 26 at an angle relative to the striker axis 70. In other words, the battery axis 38 defined by the battery pack 26 and the battery receptacle 34 is at an oblique angle relative to the striker axis 70. Further, the battery axis 38 traverses the striker axis 70. In other words, the battery axis 38 is aligned with the striker axis 70 in a vertical plane extending between the striker axis 70 and the battery axis 38. In some embodiments, the battery axis 38 may be orientated at an angle between 30 degrees and 60 degrees relative to the striker axis 70.

Figure 6:
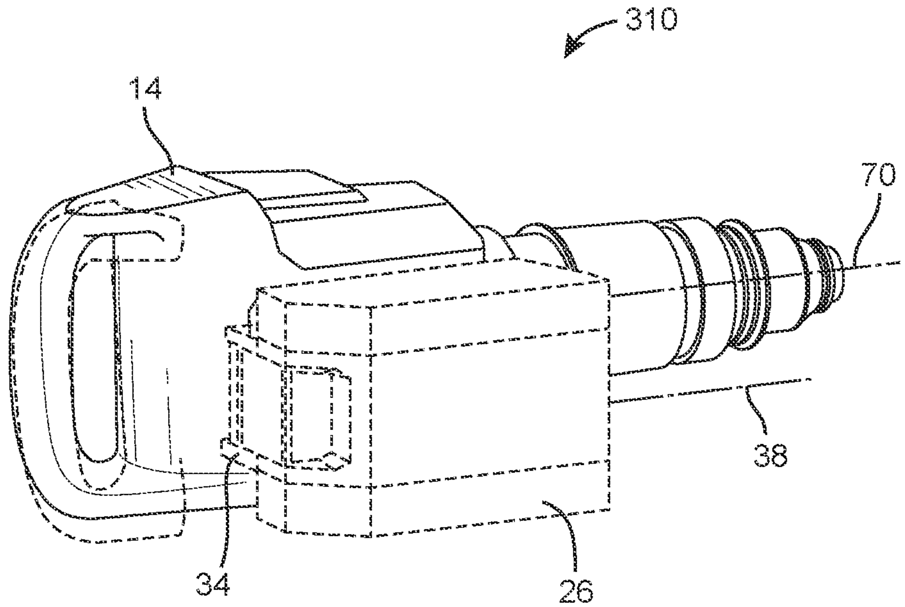
FIG. 6 is a perspective view of a percussion tool according to another embodiment.
Figure 7A:
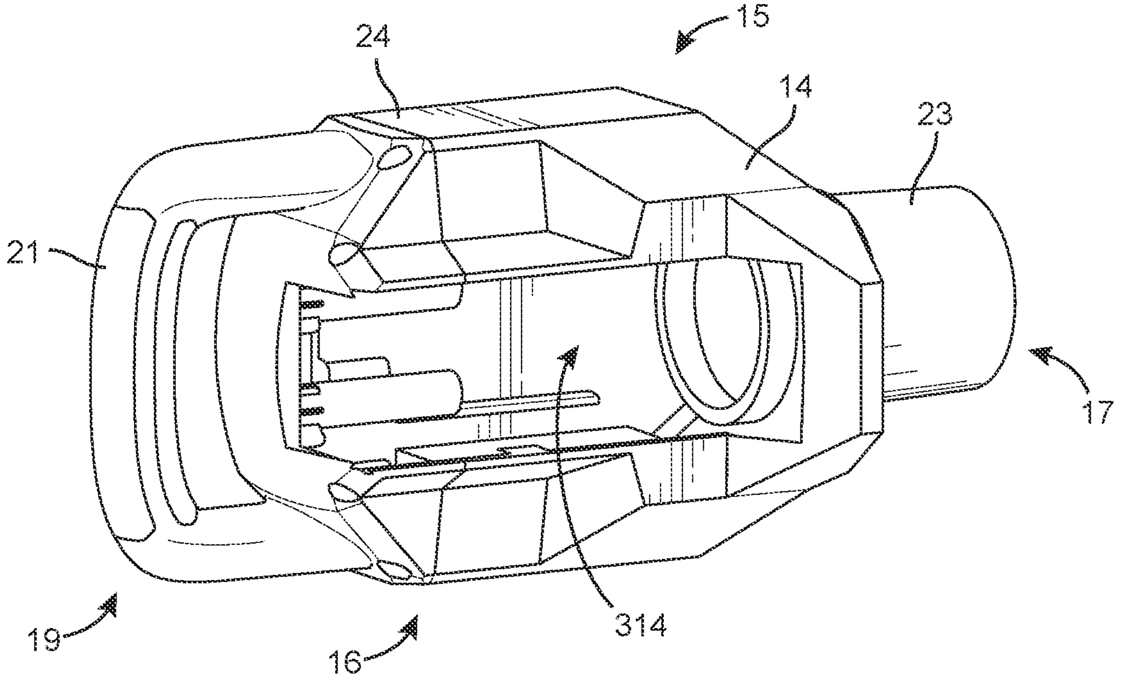
FIG. 7A is a perspective view of a housing of the percussion tool of FIG. 6.
Figure 7B:
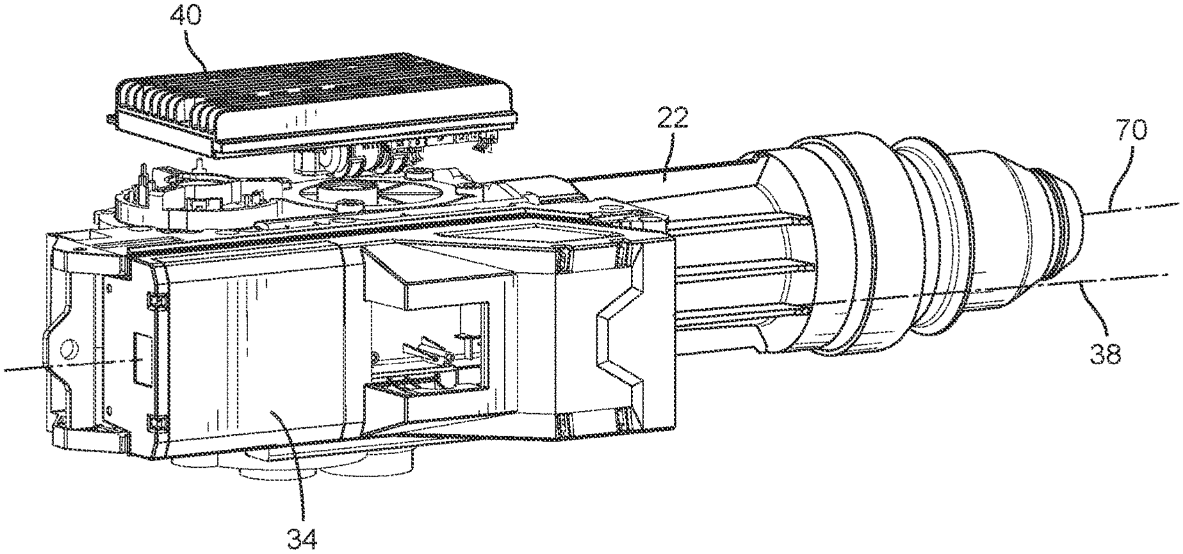
FIG. 7B is a perspective view of the percussion tool of FIG. 6 with the housing removed

FIG. 6 illustrates a demolition hammer 310 according to another embodiment of the invention. The demolition hammer 310 is similar to the demolition hammer 10 discussed above with like features being represented with like reference numbers. The demolition hammer 310 includes the housing 14, a battery receptacle 34 to receive a battery pack 26, and the percussion mechanism 22. As shown in FIG. 7A, a right side of the housing 14 defines an opening 314 to receive the battery receptacle 34, the controller 40, and the percussion mechanism 22 (FIG. 7B). As shown in FIG. 7B, when positioned in the housing 14, the controller 40 is positioned adjacent the top end 15 of the housing 14 above the percussion mechanism 22. In the illustrated embodiment, the battery receptacle 34 is positioned on a horizontal side (right side of the striker axis 70) of the gear/motor housing portion 24. The battery receptacle 34 substantially covers the percussion mechanism 22 from the horizontal side. The battery receptacle 34 receives the battery pack 26 in a direction approximately parallel to the striker axis 70. In other words, the battery axis 38 is approximately parallel to the striker axis 70. Further, the battery axis 38 is offset from the striker axis 70. Although the battery receptacle 34 is positioned on the right side of the housing 14, in some embodiments, the same arrangement could be mirrored on the left side of the housing 14.

Figure 8:
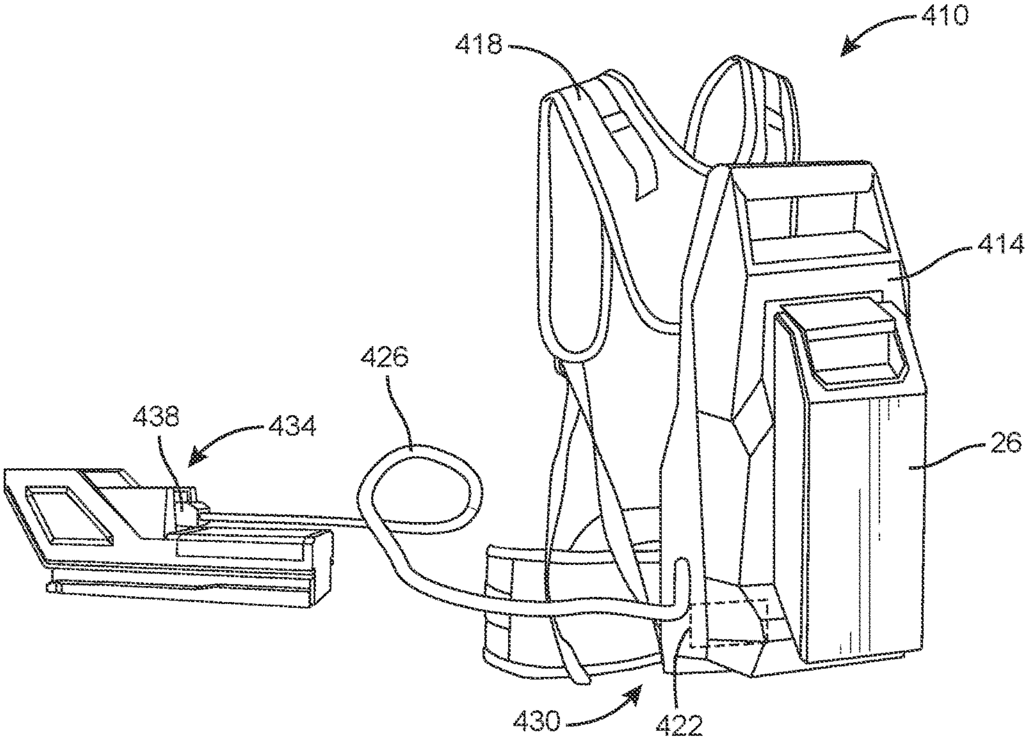
FIG. 8 is a perspective view of a remote power unit for use with a percussion tool.

FIG. 8 illustrates a remote power unit 410 for use with the percussion tools 10, 210, 310 discussed above. The remote power unit 410 includes a battery receptacle 414 that is attached to straps 418 or other riggings to allow a user to carry the remote power unit 410 in use. The remote power unit 410 also includes a battery pack 26 that is removably coupled to the battery receptacle 414 and a controller unit 422. A cable 426 includes a first end 430 coupled to the battery receptacle 414 and a second end 434 opposite the first end 430 having a connector 438. The connector 438 is configured to attach to a power port 442 (FIG. 1) or other receptacle, such as the battery receptacle 34, on the percussion tools 10, 210, 310 discussed above. The port 442 may be positioned on the barrel 23, the gear/motor housing portion 24 of the housing 14, or the handle portion 21 of the housing 14. The cable 426 provides power from the battery pack 26 to the motor 18 of the percussion tool 10. In addition, the controller unit 422 may communicate with the controller 40 of the percussion tool 10 to control operation of the motor 18 and other components of the percussion tool 10. The remote power unit 410 may be used simultaneously with or in lieu of the battery pack 26. As such, using the remote power unit 410 instead of the battery pack 26 for power removes the weight of the battery pack 26 allowing the percussion tool 10 to remain light weight and easily handled by a user.

Figure 9:
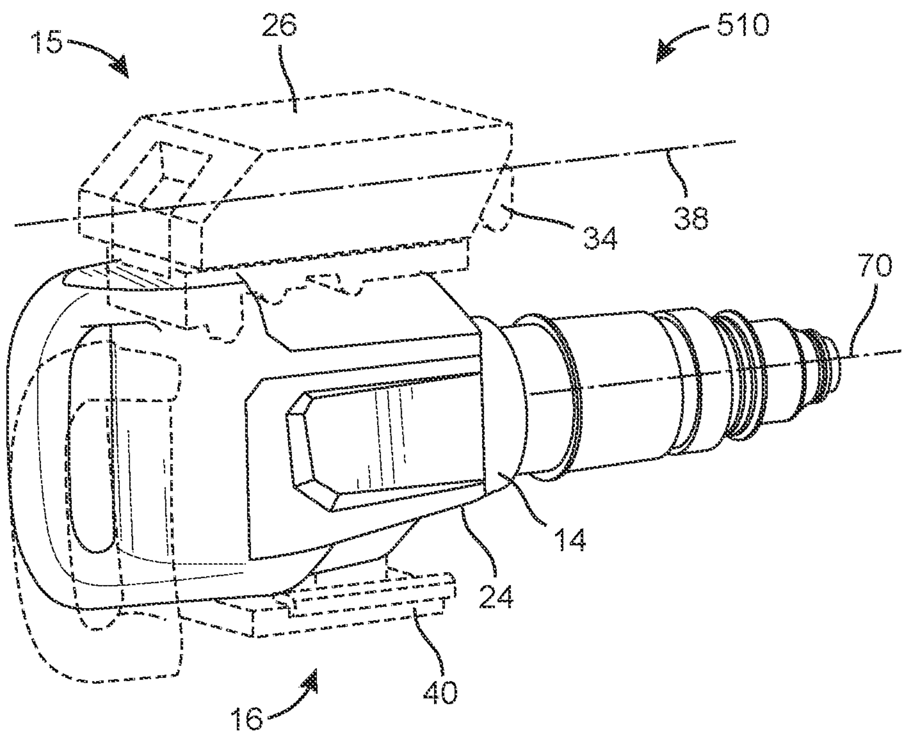
FIG. 9 is a perspective view of a percussion tool according to another embodiment.
Figure 10:
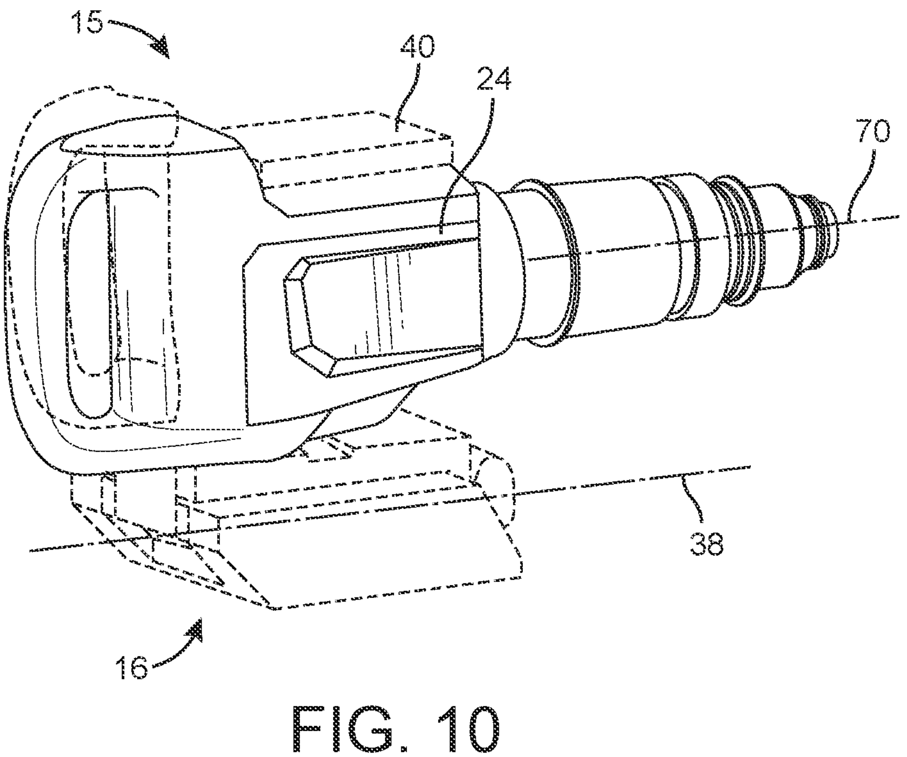
FIG. 10 is a perspective view of a percussion tool according to another embodiment.

FIG. 9 illustrates a demolition hammer 510 according to another embodiment of the invention. The demolition hammer 510 is similar to the demolition hammer 310 discussed above with like features being represented with like reference numbers. The demolition hammer 510 includes the housing 14, a battery receptacle 34 to receive a battery pack 26, and the percussion mechanism 22. The controller 40 is positioned adjacent the bottom end 16 of the housing 14 and the battery receptacle 34 is positioned on the top end 15 of the housing 14 adjacent the gear/motor housing portion 24. The battery receptacle 34 receives the battery pack 26 in a direction approximately parallel to the striker axis 70. In other words, the battery axis 38 is approximately parallel to the striker axis 70. Further, the battery axis 38 is offset from the striker axis 70. In some embodiments, such as shown in FIG. 10, the controller 40 is positioned adjacent the top end 15 of the housing 14 and the battery receptacle 34 is positioned on the bottom end 16 of the housing 14 adjacent the gear/motor housing portion 24.

Figure 11:
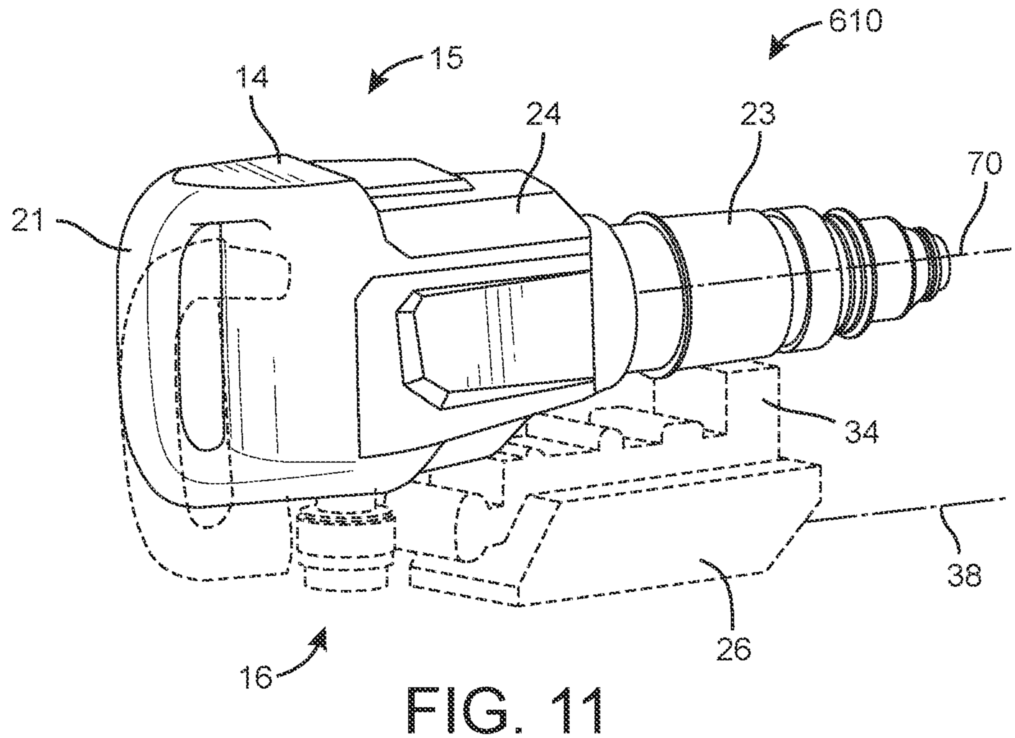
FIG. 11 is a perspective view of a percussion tool according to another embodiment.

FIG. 11 illustrates a demolition hammer 610 according to another embodiment of the invention. The demolition hammer 610 is similar to the demolition hammer 310 discussed above with like features being represented with like reference numbers. The demolition hammer 610 includes the housing 14, a battery receptacle 34 to receive a battery pack 26, and the percussion mechanism 22. In the illustrated embodiment, the battery receptacle 34 is positioned on the bottom end 16 of the housing 14 adjacent the barrel 23 of the housing 14. Similar to the demolition hammer 310 described above, the battery receptacle 34 receives the battery pack 26 in a direction approximately parallel to the striker axis 70. In other words, the battery axis 38 is approximately parallel to the striker axis 70. Further, the battery axis 38 is offset from the striker axis 70.

Figure 12:
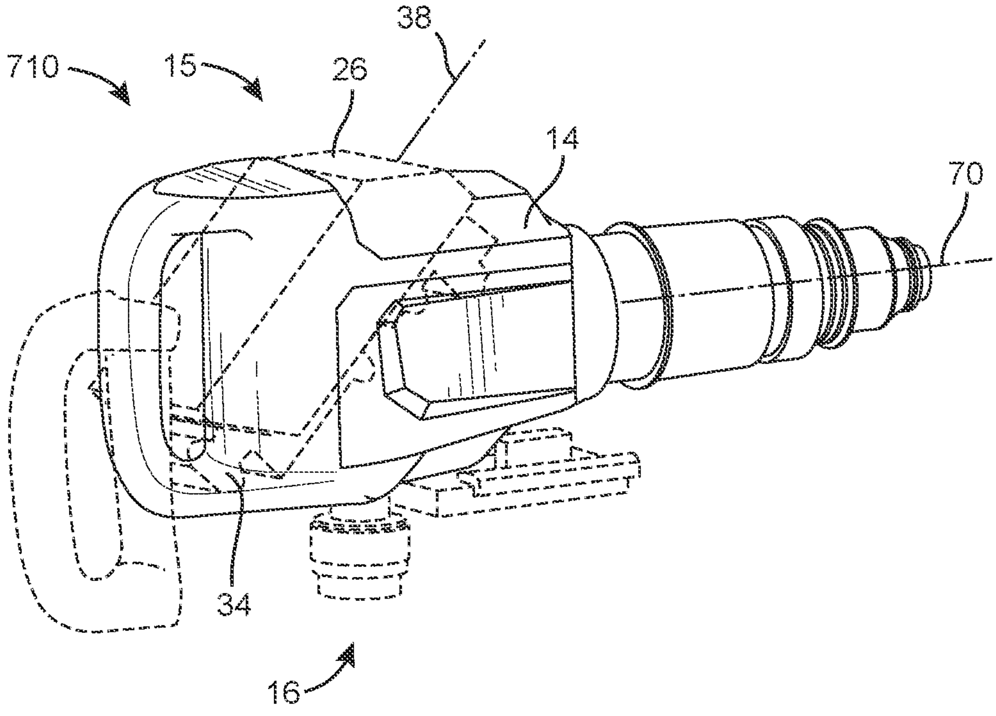
FIG. 12 is a perspective view of a percussion tool according to another embodiment.

FIG. 12 illustrates a demolition hammer 710 according to another embodiment of the invention. The demolition hammer 710 is similar to the demolition hammer 210 discussed above with like features being represented with like reference numbers. The demolition hammer 710 includes the housing 14, a battery receptacle 34 to receive a battery pack 26, and the percussion mechanism 22. The battery receptacle 34 is positioned on the top end 15 of the housing 14 adjacent the gear/motor housing portion 24. Similar to the demolition hammer 210 discussed above, the battery receptacle 34 receives the battery pack 26 at an angle relative to the striker axis 70. In other words, the battery axis 38 is at an oblique angle relative to the striker axis 70. Further, the battery axis 38 transverses the striker axis 70. In other words, the battery axis 38 is aligned with the striker axis 70 in a vertical plane extending between the striker axis 70 and the battery axis 38.

Figure 13:
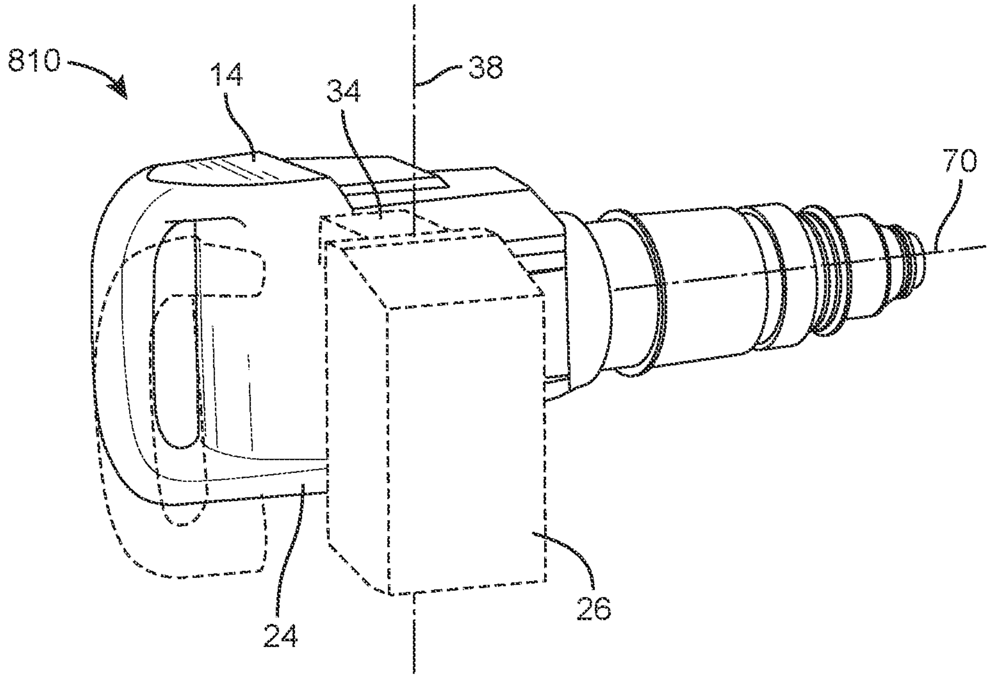
FIG. 13 is a perspective view of a percussion tool according to another embodiment.

FIG. 13 illustrates a demolition hammer 810 according to another embodiment of the invention. The demolition hammer 810 is similar to the demolition hammer 310 discussed above with like features being represented with like reference numbers. The demolition hammer 810 includes the housing 14, a battery receptacle 34 to receive a battery pack 26, and the percussion mechanism 22. The battery receptacle 34 is positioned on a horizontal side (right side of the striker axis 70) of the gear/motor housing portion 24. The battery receptacle 34 substantially covers the percussion mechanism 22 from the horizontal side. The battery receptacle 34 receives the battery pack 26 in a direction approximately perpendicular to the striker axis 70. In other words, the battery axis 38 is approximately perpendicular to the striker axis 70. Although the battery receptacle 34 is positioned on the right side of the housing 14, in some embodiments, the same arrangement could be mirrored on the left side of the housing 14.

Figure 14:
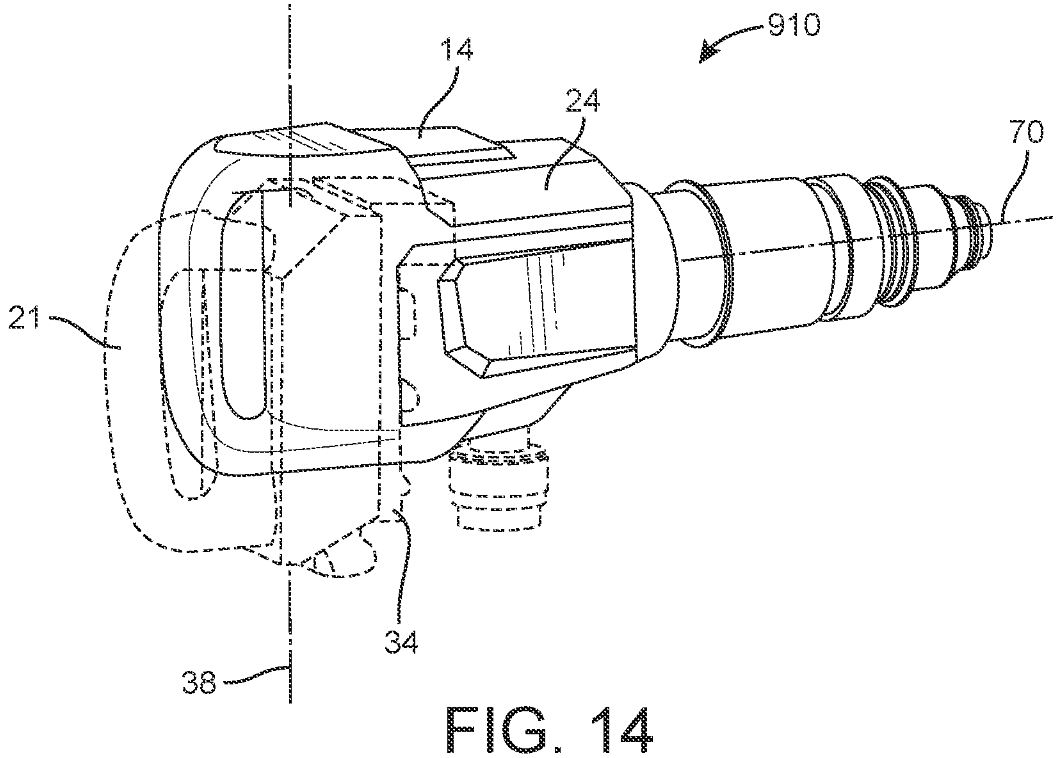
FIG. 14 is a perspective view of a percussion tool according to another embodiment.

FIG. 14 illustrates a demolition hammer 910 according to another embodiment of the invention. The demolition hammer 910 is similar to the demolition hammer 310 discussed above with like features being represented with like reference numbers. The demolition hammer 910 includes the housing 14, a battery receptacle 34 to receive a battery pack 26, and the percussion mechanism 22. The battery receptacle 34 is positioned between the gear/motor housing portion 24 and the handle portion 21 of the housing 14. The battery receptacle 34 receives the battery pack 26 in a direction approximately perpendicular to the striker axis 70. In other words, the battery axis 38 is approximately perpendicular to the striker axis 70. In addition, the battery axis 38 and the striker axis 70 lie in the same vertical plane.

Figure 15:
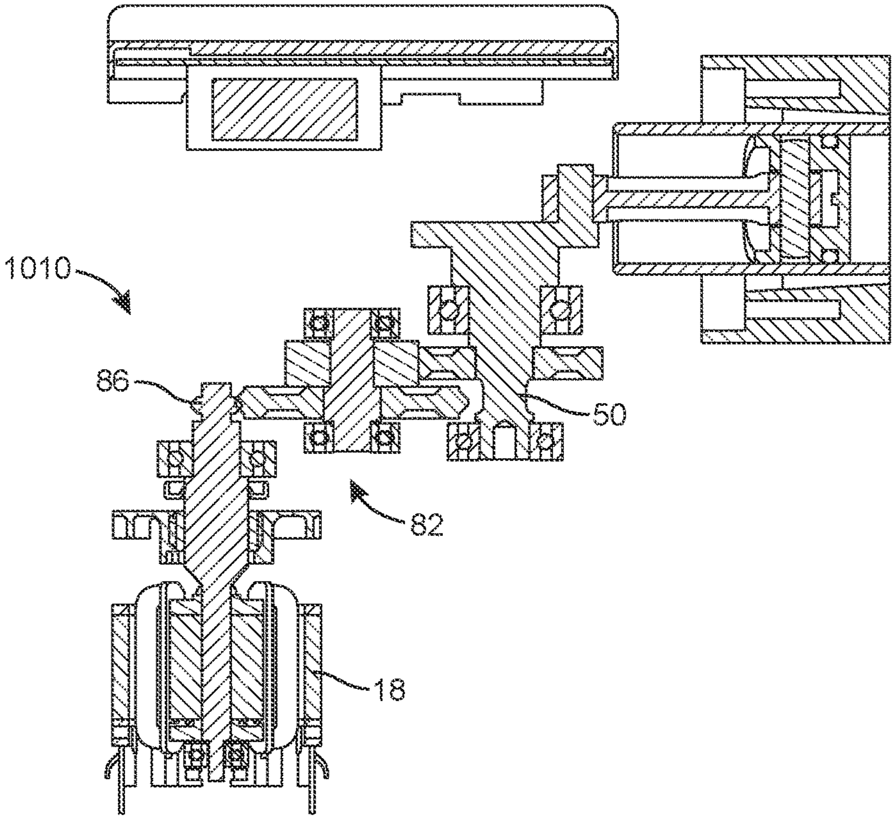
FIG. 15 is a plan view of a gear train for use with a percussion tool according to another embodiment.

FIG. 15 illustrates a gear train 1010 for use with the percussion tools discussed above according to another embodiment of the invention. The gear train 1010 is similar to the gear train 46 discussed above with like features being represented with like reference numbers. The gear train 1010 includes the crank shaft 50, the idler gear assembly 82, and the output shaft 86 of the motor 18. However, the motor 18 and the output shaft 86 have been rotated 180 degrees compared to the gear train 46, such the at the output shaft 86 of the motor 18 extends from the motor 18 in a direction towards the top end 15 of the housing 14.

Figure 16:
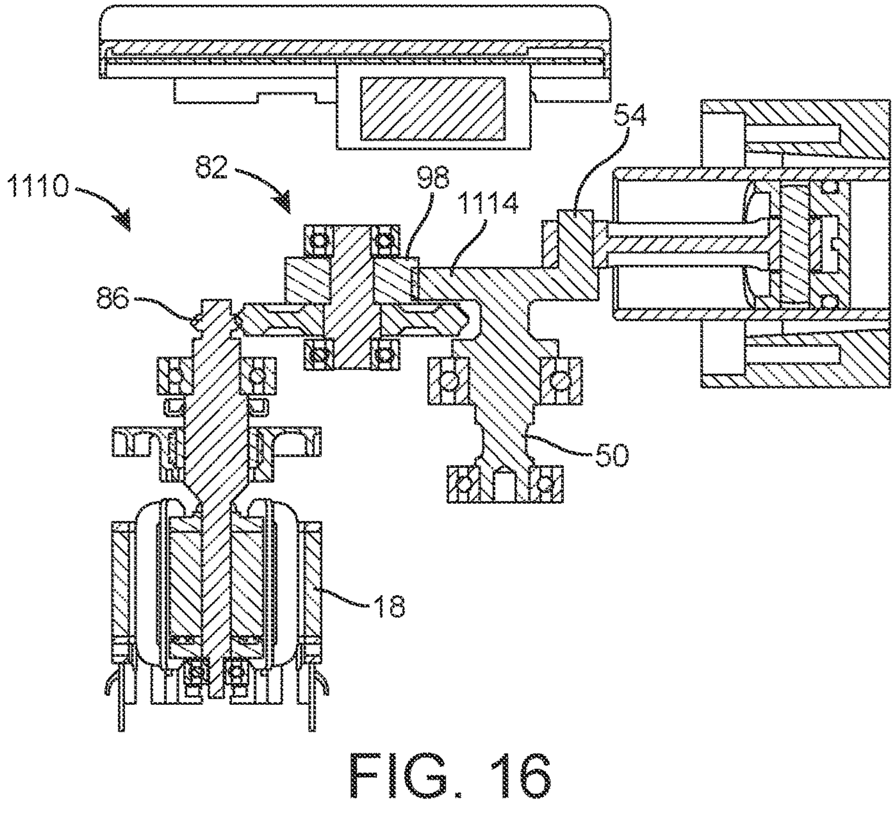
FIG. 16 is a plan view of a gear train for use with a percussion tool according to another embodiment.

FIG. 16 illustrates a gear train 1110 for use with the percussion tools discussed above according to another embodiment of the invention. The gear train 1110 is similar to the gear train 46 discussed above with like features being represented with like reference numbers. The gear train 1110 includes the output shaft 86 of the motor 18, the idler gear assembly 82, and the crank shaft 50. However, the third gear 102 has been removed from the crank shaft 50. Instead, the second gear 98 directly meshes with a gear portion 1114 of the crank shaft 50 to rotate the crank shaft 50.

Figure 17:
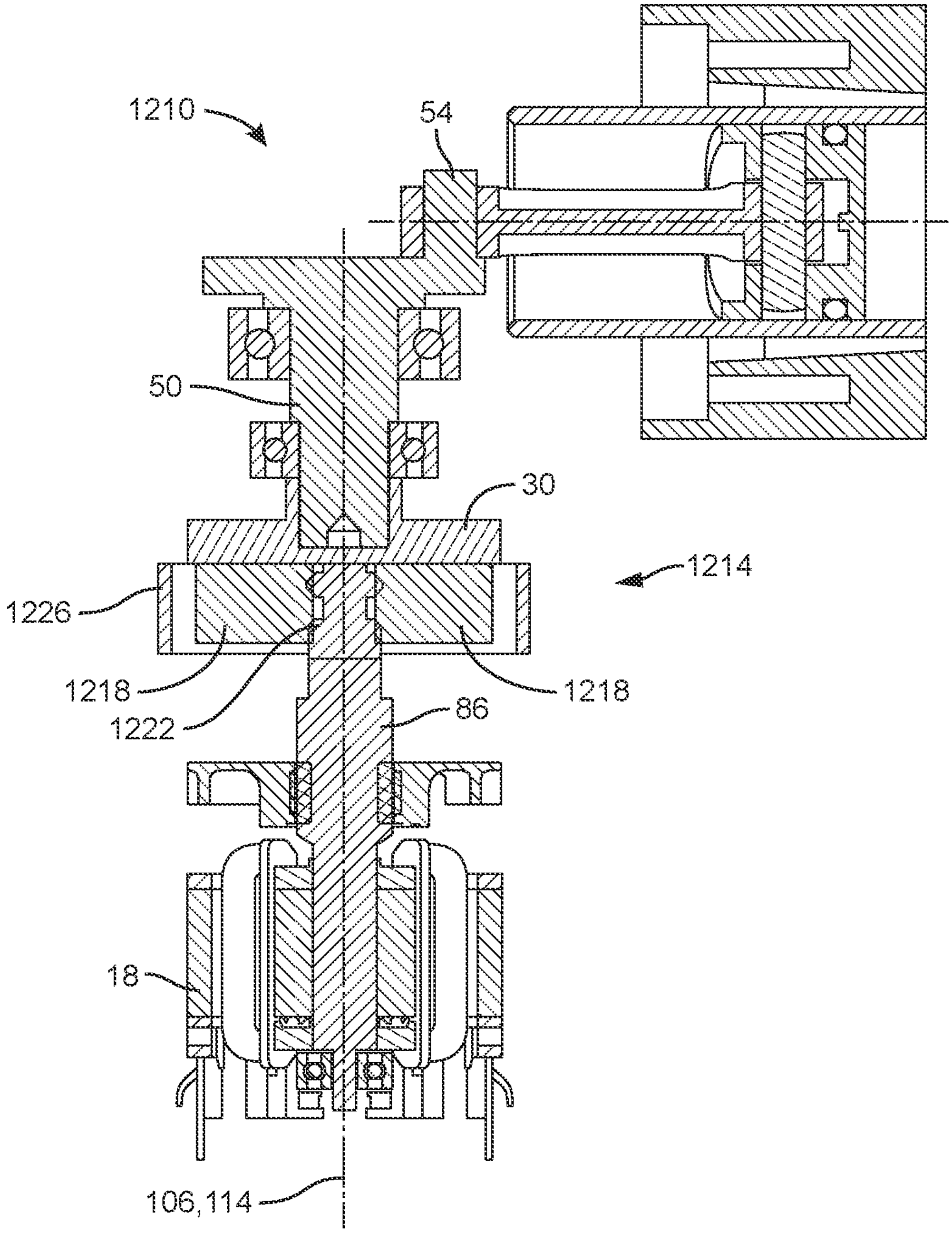
FIG. 17 is a plan view of a gear train for use with a percussion tool of according to another embodiment.
Figure 18:
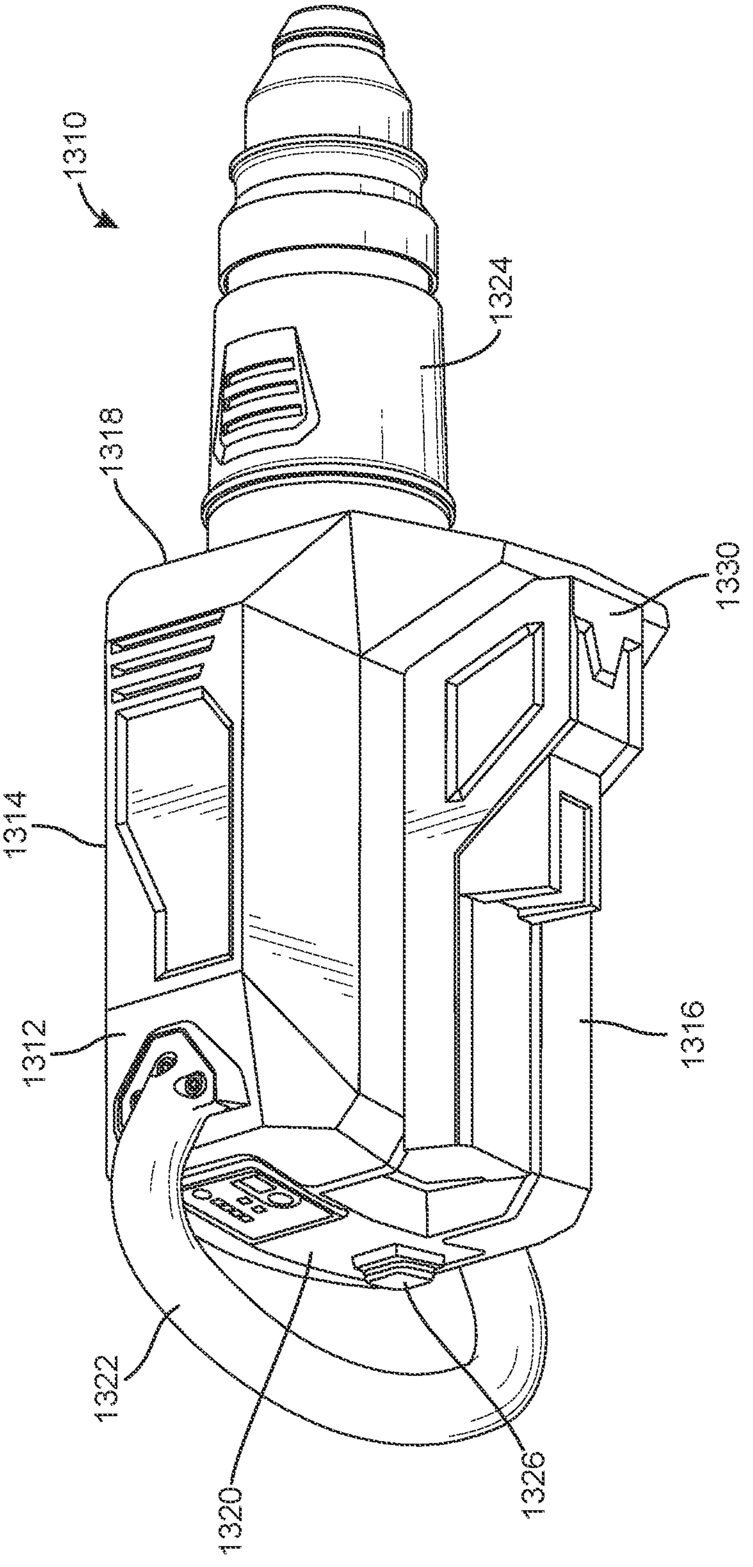
FIG. 18 is a perspective view of a percussion tool according to another embodiment.
Figure 19:
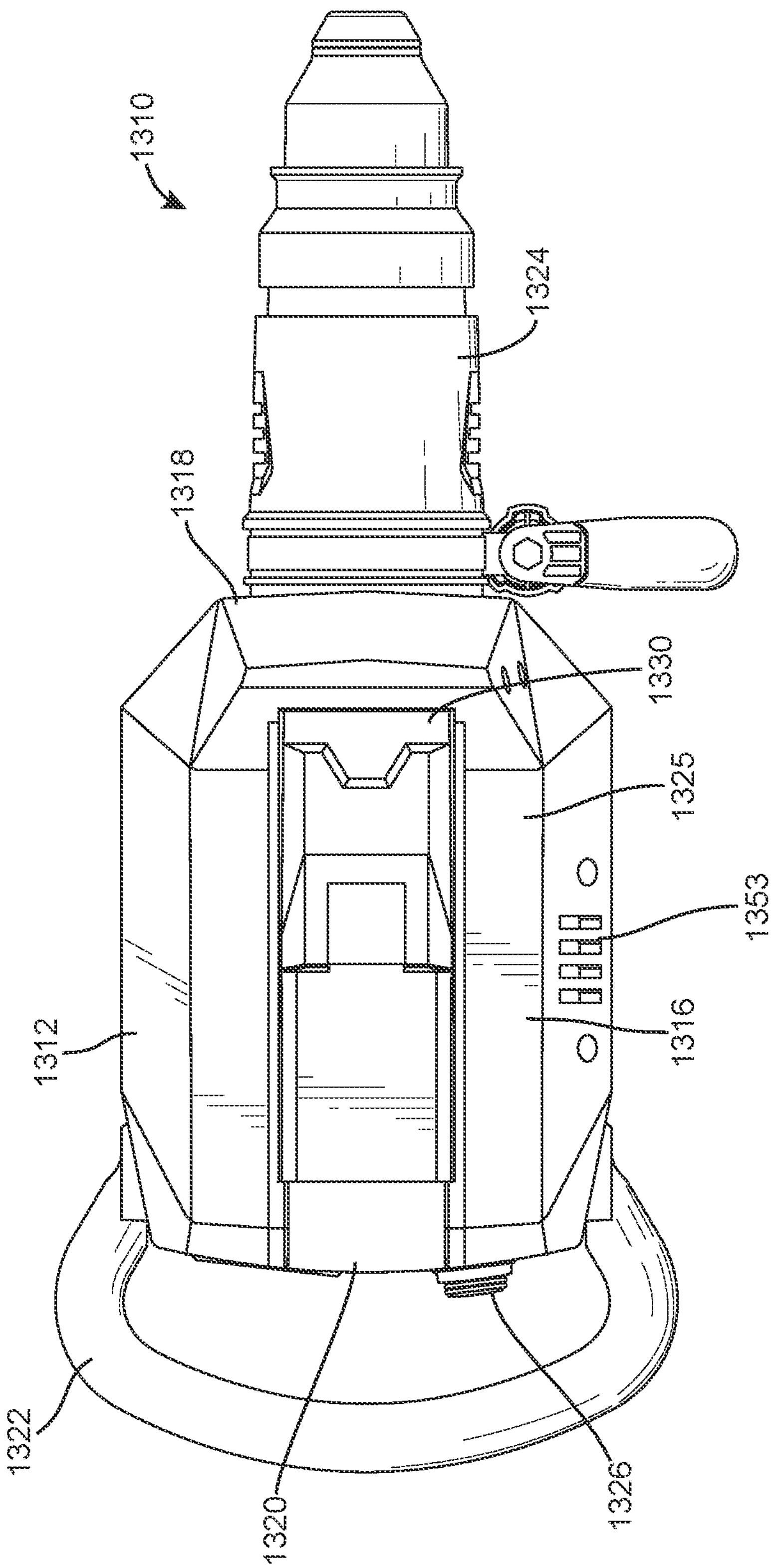
FIG. 19 is a bottom plan view of the percussion tool of FIG. 18.

FIG. 17 illustrates a gear train 1210 for use with the percussion tools discussed above according to another embodiment of the invention. The gear train 1210 is similar to the gear train 46 discussed above with like features being represented with like reference numbers. The gear train 1210 includes the output shaft 86 of the motor 18 and the crank shaft 50. However, the idler gear assembly 82 has been removed and replaced with a planetary gear set 1214. The planetary gear set 1214 includes a plurality of planet gears 1218 coupled to the output shaft 86 through a sun/pinion gear 1222. The planetary gear set 1214 also includes a ring gear 1226 and a carrier 1230. The carrier 1230 is coupled to the crank shaft 50 to transfer torque from the motor 18 to the crank shaft 50. In the illustrated embodiment, the rotational axis 106 of the output shaft 86 is co-axial with the rotational axis 114 of the crank shaft 50.

Referring now to FIGS. 18-24, another percussion tool, e.g., a demolition hammer 1310, is shown and includes a housing 1312 having a top end 1314, a bottom end 1316, a front side 1318, and a rear side 1320. The housing 1312 includes a handle portion 1322 extending from the rear side 1320 and a barrel 1324 extending from the front side 1318. A gear/motor housing portion 1325 extends between the handle portion 1322 and the barrel 1324. A trigger 1326 is disposed on the rear side 1320 of the housing 1312 adjacent the handle portion 1322 to selectively activate a motor within the housing 1312.

Figure 20:
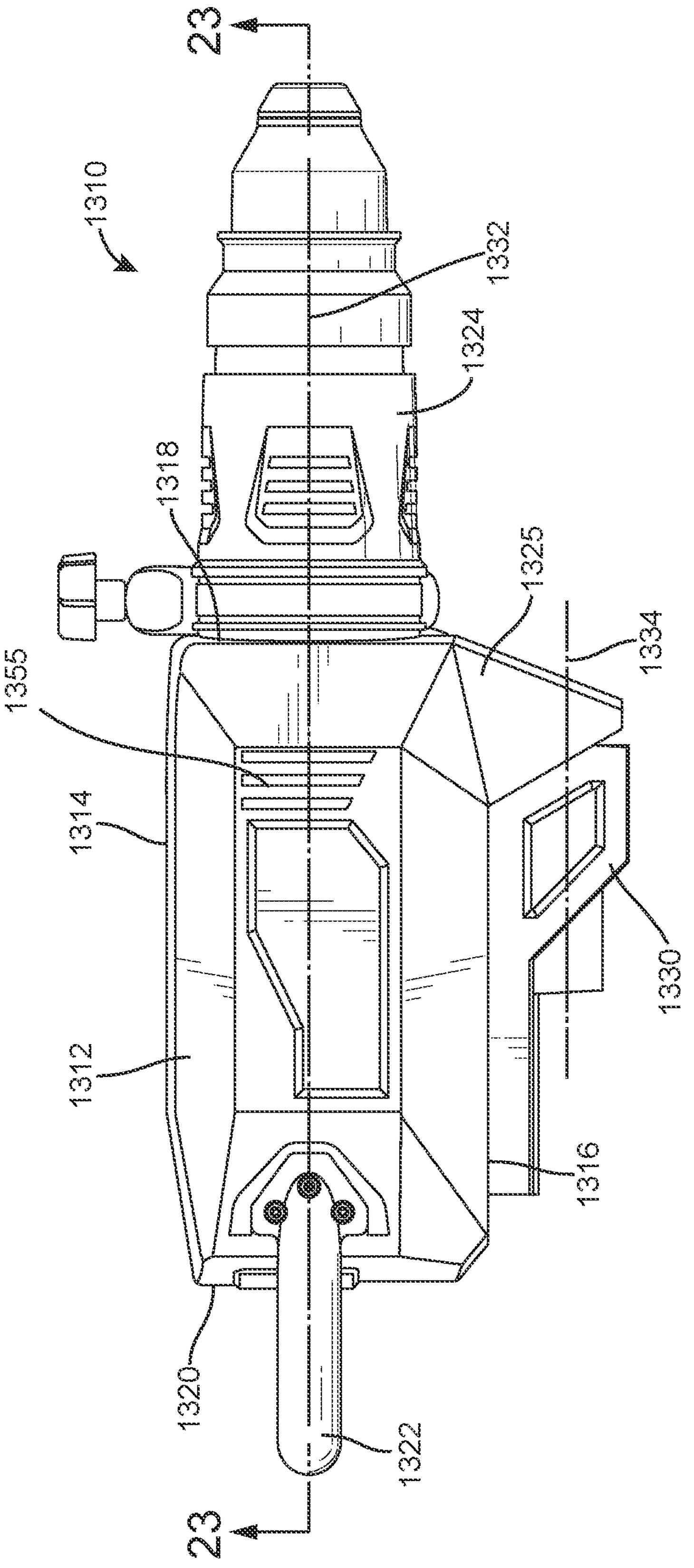
FIG. 20 is a side plan view of the percussion tool of FIG. 18.
Figure 21:
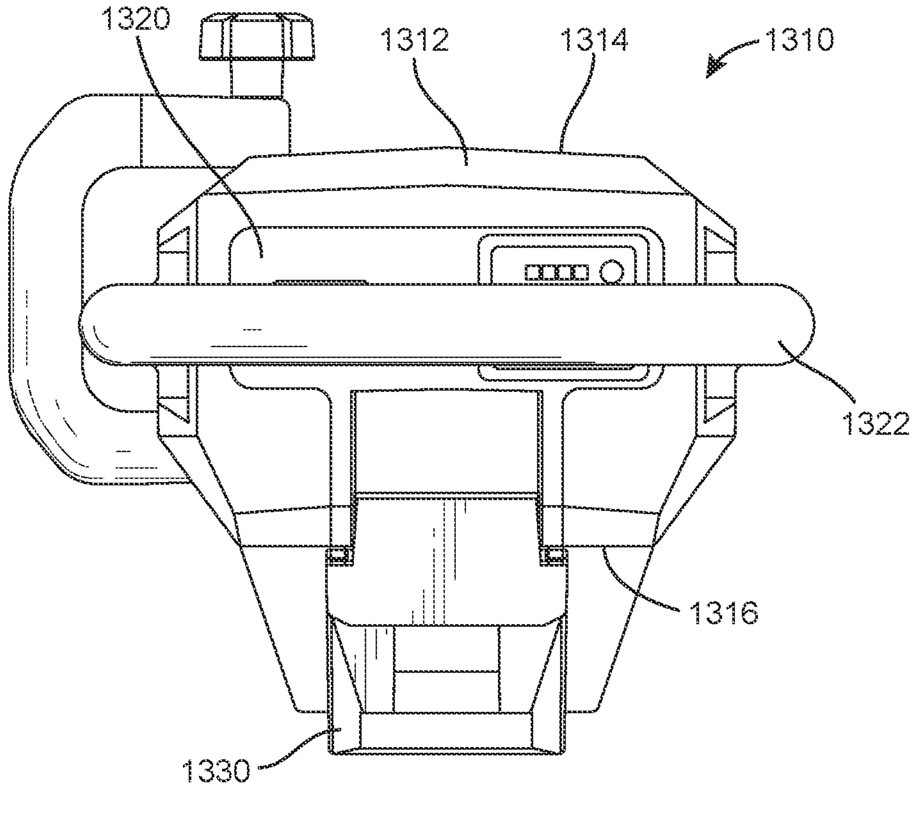
FIG. 21 is a rear plan view of the percussion tool of FIG. 18.
Figure 22:
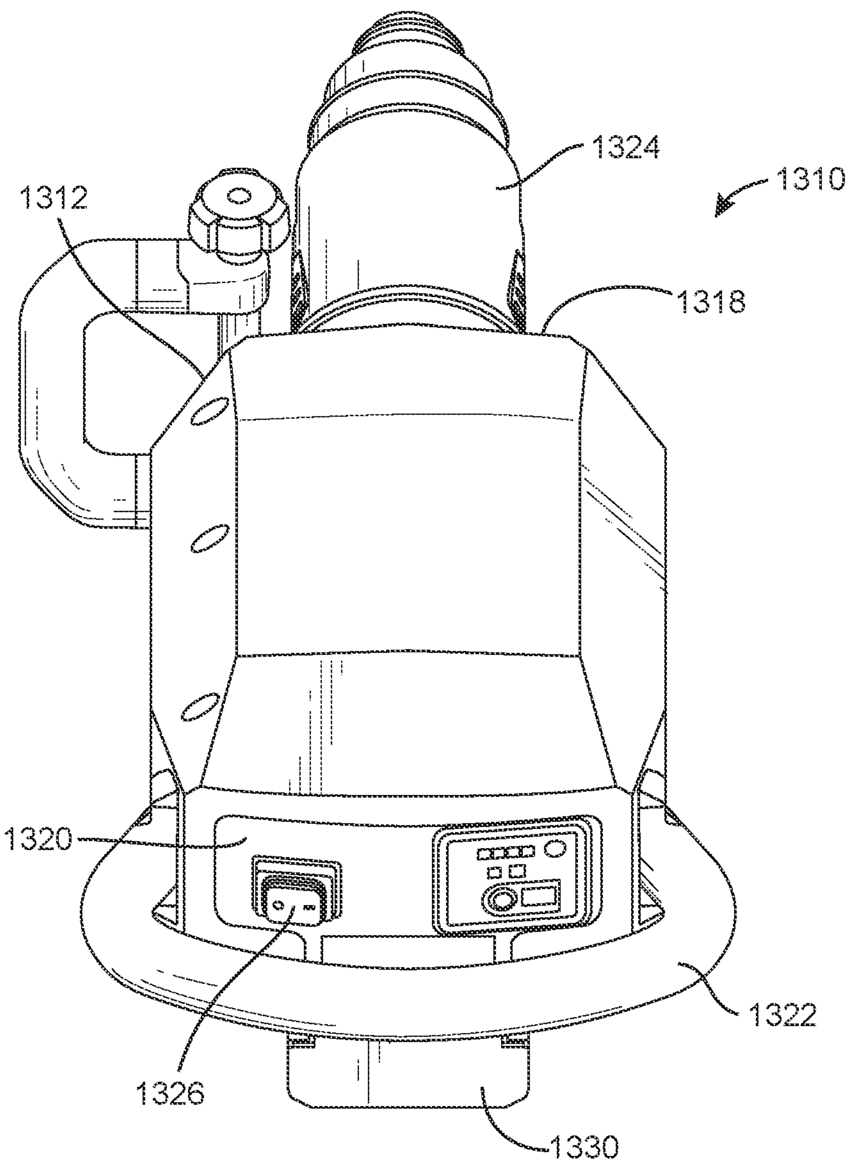
FIG. 22 is a perspective view of the percussion tool of FIG. 18.

As described elsewhere, the demolition hammer 1310 is operable to be powered by an AC power source or a DC power source. The bottom end 1316 of the demolition hammer 1310 includes a battery receptacle 1330 to which a battery pack may be removably engaged. FIG. 20 shows that the demolition hammer 1310 defines a longitudinal axis 1332 that extends along the length of the demolition hammer 1310 from the handle portion 1322 through the barrel 1324. The battery receptacle 1330 also defines a battery installation axis 1334 along which a battery slides as the battery is being engaged with, or removed from, the battery receptacle 1330. In particular, the battery installation axis 1334 is parallel to the longitudinal axis 1332 of the demolition hammer 1310. Further, as shown, a distance D1 from the longitudinal axis 1332 of the demolition hammer 1310 to the top end 1314 of the demolition hammer 1310 is less than a distance D2 from the longitudinal axis 1332 of the demolition hammer 1310 to the bottom end 1316 of the demolition hammer 1310. In a particular aspect, the distance D1 is less than or equal to 0.80 D2, such as less than or equal to 0.75 D2, or less than or equal to 0.70 D2. Further, the distance D1 is greater than or equal to 0.50 D2, such as greater than or equal to 0.55 D2, greater than or equal to 0.60 D2, or greater than or equal to 0.65 D2. It is to be understood that the distance D1 may be within a range between, and including, any of the maximum and minimum values of D1 described herein.

Figure 23:
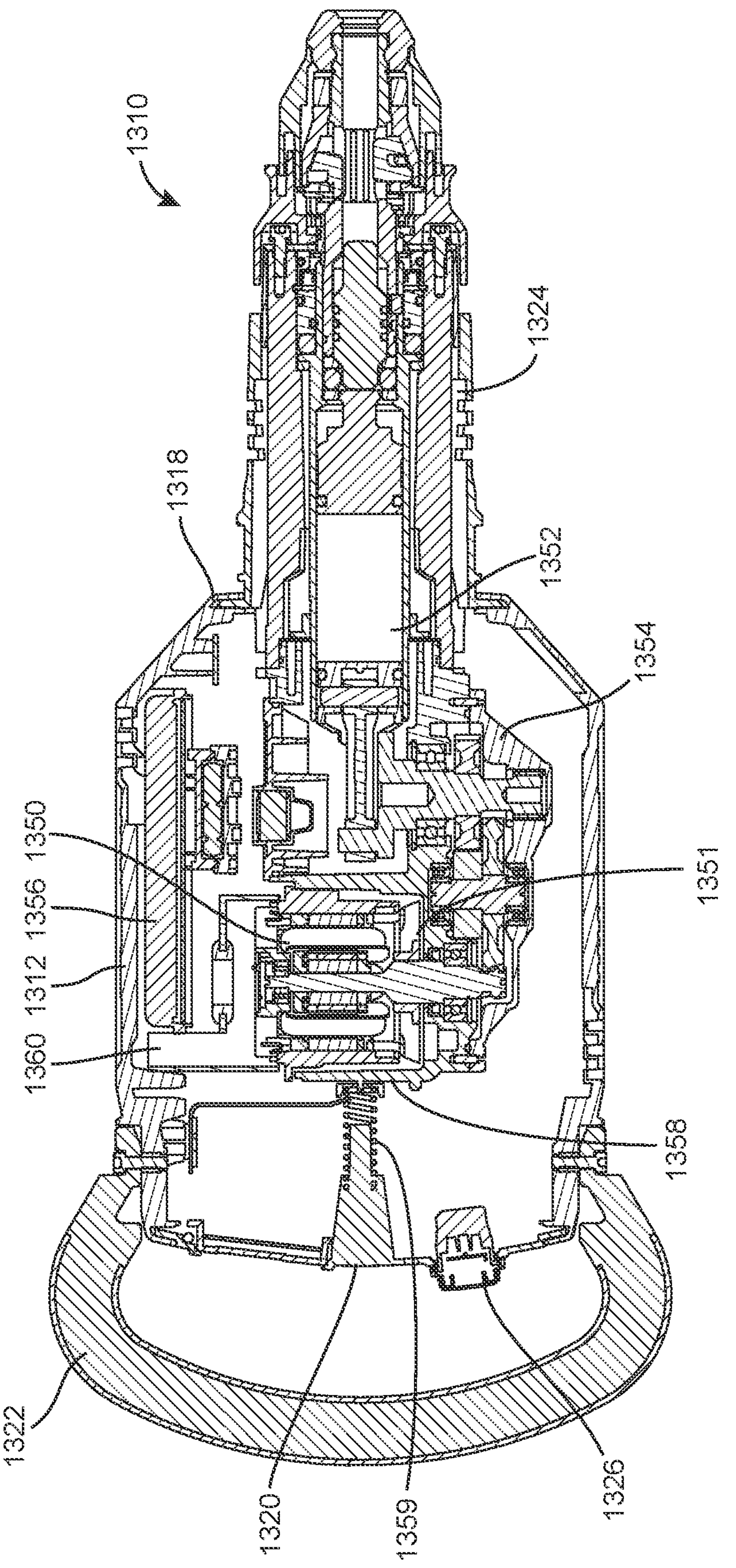
FIG. 23 is a cross section view of the percussion tool of FIG. 18 taken along Line 23-23 in FIG. 20.
Figure 24:
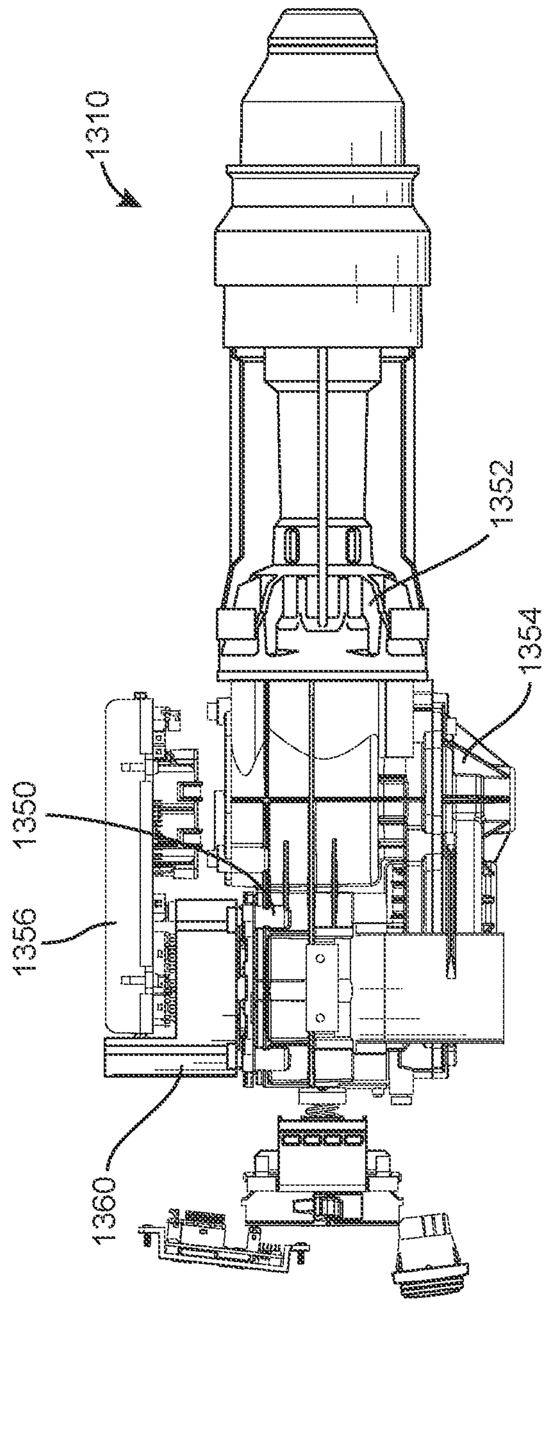
FIG. 24 is a plan view of the percussion tool of FIG. 18 with an outer housing removed.
Figure 25:
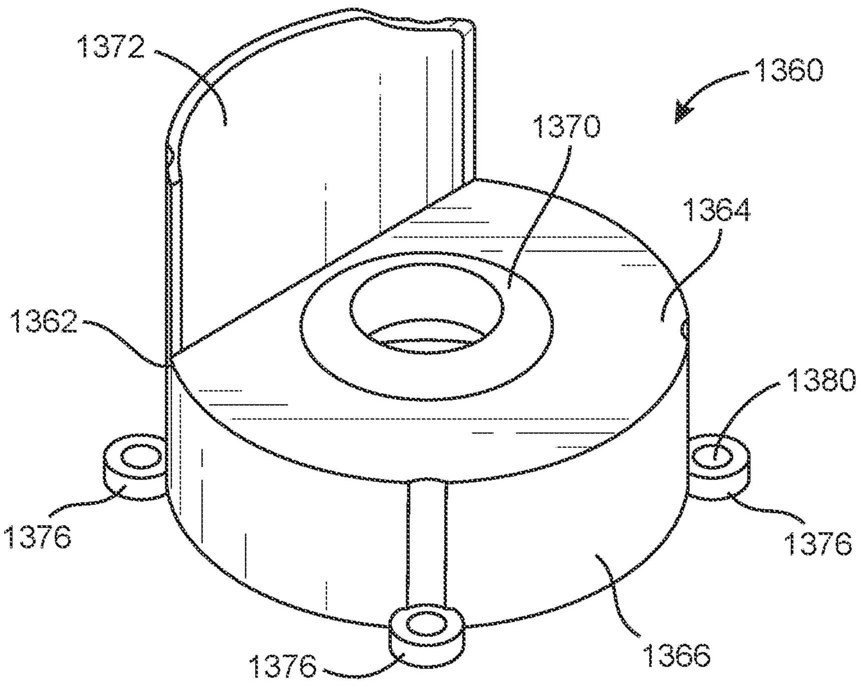
FIG. 25 is a perspective view of an air baffle for the percussion tool of FIG. 18.
Figure 26:
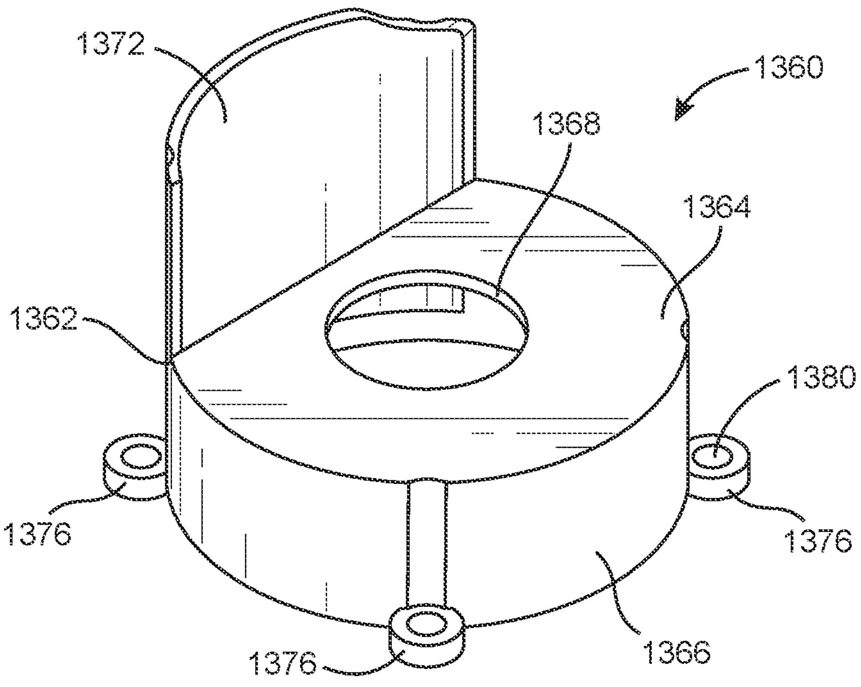
FIG. 26 is another perspective of the air baffle of FIG. 25.

As shown in FIGS. 23 and 24, the demolition hammer 1310 further includes a motor 1350 operably coupled to a percussion mechanism 1352 via a gear train 1354. An axial flow fan 1351 is disposed between the motor 1350 and the gear train 1354. The axial flow fan 1351 induces an airflow into the housing 1312 when the motor 1350 rotates. The housing 1312 includes a plurality of inlet vents 1353 (FIG. 19) and a plurality of outlet vents 1355 (FIG. 20) to allow airflow through the demolition hammer 1310.

The motor 1350 is similar to the motor 18 described above. The percussion mechanism 1352 is similar to the percussion mechanism 22 described above. Moreover, the gear train 1354 is similar to the gear train 46 described above. The demolition hammer 1310 also includes a controller 1356 that is similar to the controller 40 described above. The controller 1356 includes a printed circuit board on which a plurality of field-effect transistors (FETs) mounted thereon. The FETs are configured to selectively direct electrical current from a battery pack to a stator of the motor 1350. An air baffle 1360 is installed between the motor 1350 and the controller 1356. Specifically, the air baffle 1360 is coupled to an end of the motor 1350 adjacent the controller 1356. The air baffle 1360 allows fluid communication (i.e., airflow) between the controller 1356 and the motor 1350. The motor 1350 is disposed within a crank case 1358 and a spring 1359 is disposed between the crank case 1358 and the housing 1312 to attenuate vibration between the crank case 1358 and the housing 1312.

Figure 27:
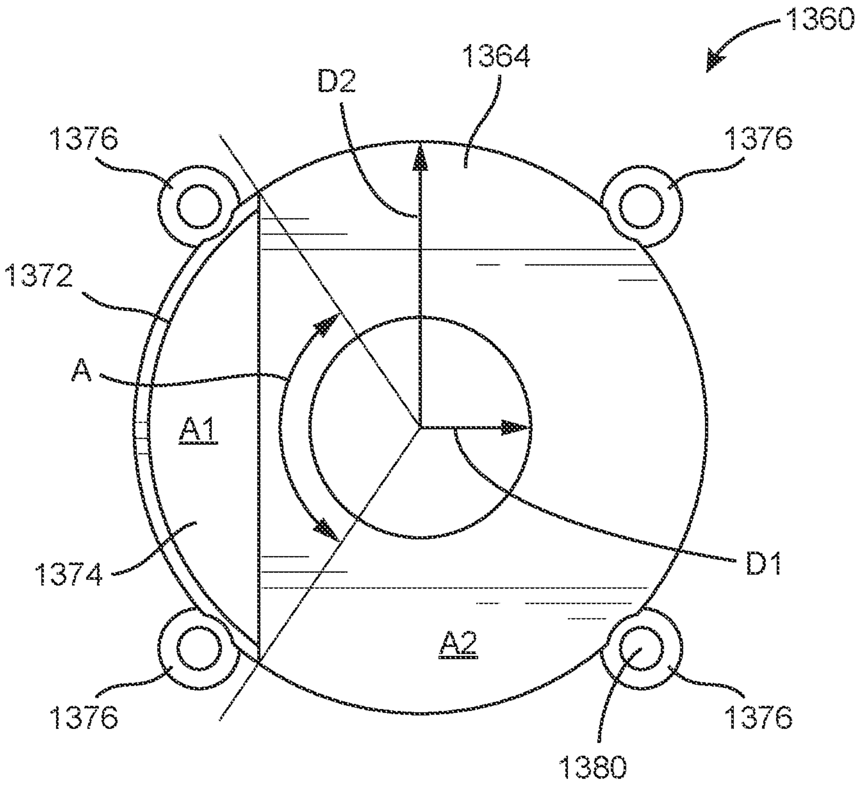
FIG. 27 is a side plan view of the air baffle of FIG. 25.

As shown in FIGS. 25-32, the air baffle 1360 includes a generally cylindrical, hollow base 1362 that includes a generally disc-shaped end plate 1364 and a generally cylindrical sidewall 1366 that extends from the end plate 1364. The cylindrical sidewall 1366 fits over an end of the motor 1350. The end plate 1364 is formed with a central, generally circular opening 1368 through which a plurality of wires between the stator of the motor 1350 and the FETs on the controller 1356 are routed. To protect the wires from chafing, a grommet 1370 may be installed in the circular opening 1368. As shown in FIG. 27, the opening 1368 has a radius R1 and the base 1362 has an overall radius R2. The radius R1 is greater than or equal to 0.250 R2, such as greater than or equal to 0.275 R2, greater than or equal to 0.300 R2, greater than or equal to 0.325 R2, greater than or equal to 0.350 R2, or greater than or equal to 0.375 R2. Further, the radius R1 is less than or equal to 0.500 R2, such as less than or equal to 0.475 R2, less than or equal to 0.450 R2, less than or equal to 0.425 R2, or less than or equal to 0.400 R2.

As illustrated in FIGS. 25-29 and FIGS. 31-32, the air baffle 1360 further includes a curved air director 1372 that extends from the sidewall 1366 in a direction that is perpendicular to the end plate 1364. As shown in FIG. 27, the air director 1372 extends partially along the perimeter of the sidewall 1366 over an angle A. The angle A is greater than or equal to 90 degrees, such as greater than or equal to 95 degrees, greater than or equal to 100 degrees, greater than or equal to 105 degrees, greater than or equal to 110 degrees. In another aspect, the angle A is less than or equal to 130 degrees, such as less than or equal to 125 degrees, less than or equal to 120 degrees, or less than or equal to 115 degrees. Further still, the angle A is 112 degrees. It is to be understood that the angle A may be within a range between and including any of the maximum and minimum values of A disclosed herein.

Figure 28:
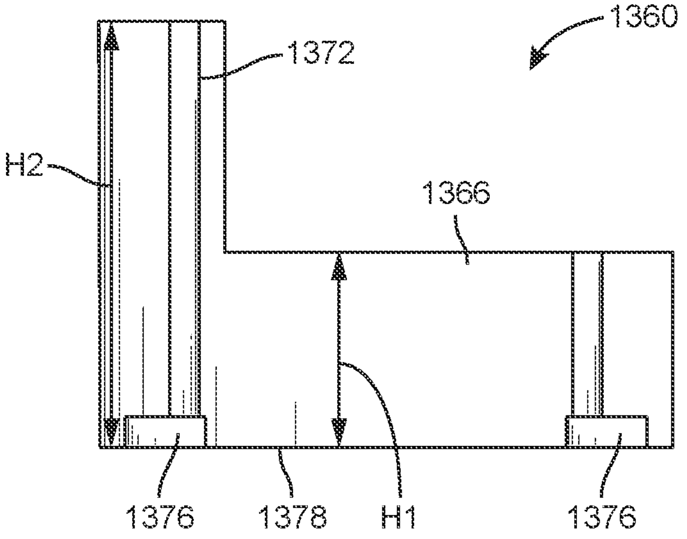
FIG. 28 is a bottom plan view of the air baffle of FIG. 25.
Figure 29:
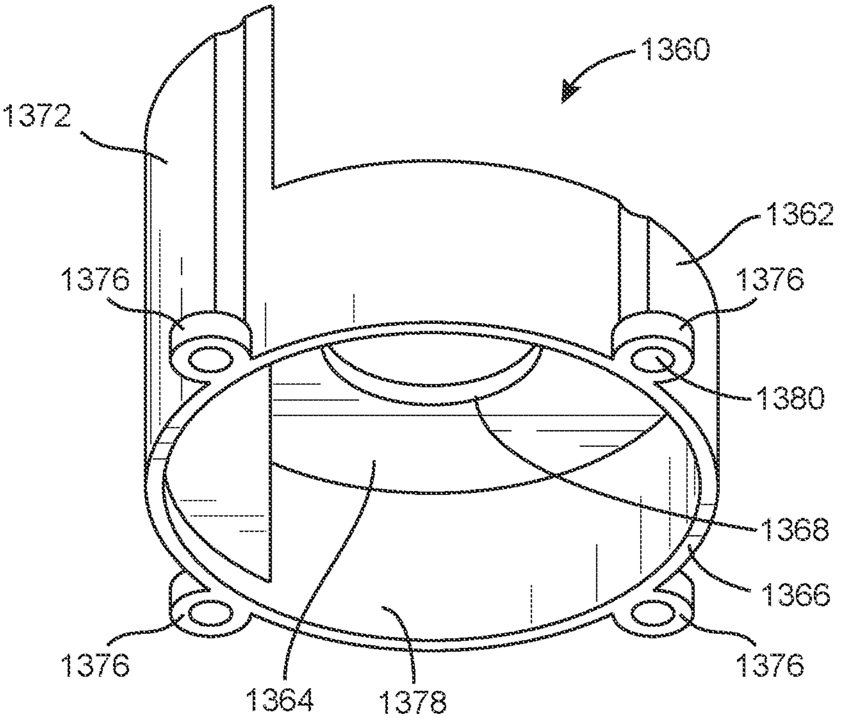
FIG. 29 is another perspective view of the air baffle of FIG. 25.
Figure 30:
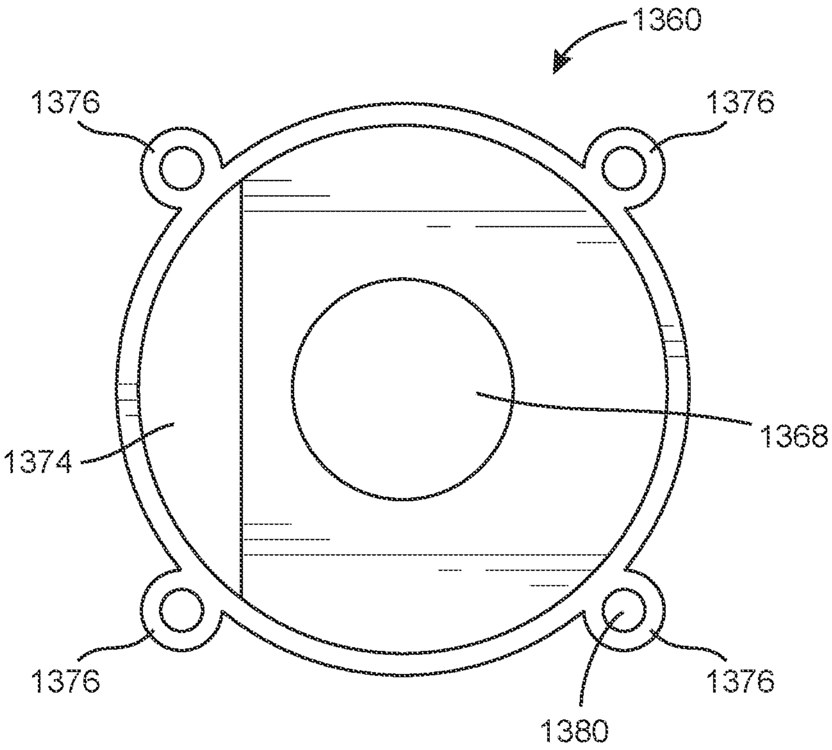
FIG. 30 is another side plan view of the air baffle of FIG. 25.
Figure 31:
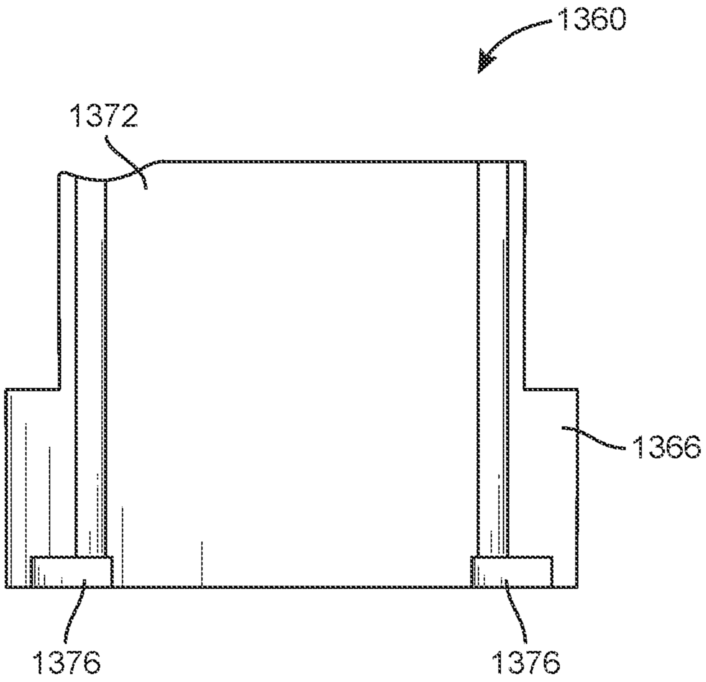
FIG. 31 is a rear plan view of the air baffle of FIG. 25.
Figure 32:
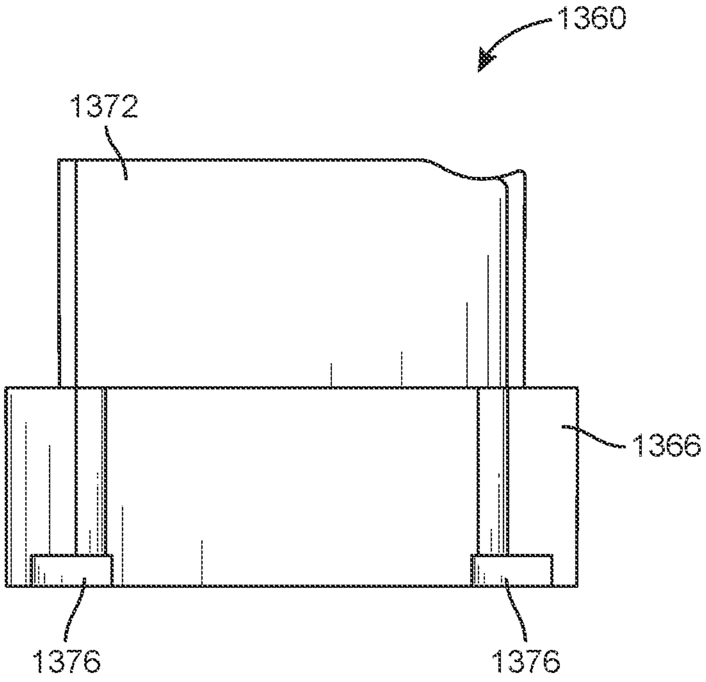
FIG. 32 is a front plan view of the air baffle of FIG. 25.

FIG. 28 shows that the air baffle 1360 has a height H1 measured through the sidewall 1366 of the base 1362 and a height H2 measured through the air director 1372. In a particular aspect, the height H2 is greater than the height H1. Further, the height H2 is greater than or equal to 1.8 H1, such as greater than or equal to 1.9 H1, greater than or equal to 2.0 H1, greater than or equal to 2.1 H1, or greater than or equal to 2.2 H1. In another aspect, the height H2 is less than or equal to 2.7 H1, such as less than or equal to 2.6 H1, less than or equal to 2.5 H1, less than or equal to 2.4 H1, or less than or equal to 2.3 H1. It is to be understood that the height H2 may be within a range between and including any of the maximum and minimum values of H2 disclosed herein.

The air baffle 1360 further includes an air exchange opening 1374 formed in the plate 1364 adjacent the air director 1372. Specifically, the axial flow fan 1351 adjacent the motor 1350 induces an airflow into the housing 1312 via the inlet vents 1353, over the controller 1356, through the air exchange opening 1374 in the air baffle 1360, and into the motor 1350 to cool the motor 1350. The air exchange opening 1374 allows air to flow through the air baffle 1360 and into (and through) the motor 1350. Heated air is exhausted from the housing 1312 via the outlet vents 1355. The air director 1372 facilitates the air flow into the air exchange opening 1374. The air flow reduces heat related issues for the demolition hammer 1310. The end plate 1364 has as total area A1 (in plan view) and the air exchange opening 1374 extends over an area A2 that is a portion of the total area A1 of the end plate 1364 of the air baffle 1360. In a particular aspect, the area A2 of the air exchange opening 1374 is greater than or equal to 0.100 A1, such as greater than or equal to 0.105 A1, greater than or equal to 0.110 A1, greater than or equal to 0.115 A1, greater than or equal to 0.120 A1, greater than or equal to 0.125 A1, greater than or equal to 0.130 A1, greater than or equal to 0.135 A1, or greater than or equal to 0.140 A1. Further the area A2 is less than or equal to 0.200 times A1, such as less than or equal to A1, less than or equal to 0.190 A1, less than or equal to 0.185 A1, less than or equal to A1, less than or equal to 0.175 A1, less than or equal to 0.170 A1, less than or equal to A1, less than or equal to 0.160 A1, less than or equal to 0.155 A1, less than or equal to A1, or less than or equal to 0.145 A1. It is to be understood that the area A2 may be within a range between, and including, any of the minimum or maximum values of A2 described herein.

With reference to FIGS. 25-32, the air baffle 1360 includes a plurality of mounting tabs 1376 that extend radially outward from the sidewall 1366 adjacent an open end 1378 of the base 1362. Specifically, there are four mounting tabs 1376 and each mounting tab 1376 is generally circular and includes a central bore 1380 through which a fastener can be inserted to mount the air baffle 1360 to the crank case 1358. The motor 1350 fits into the crank case 1358 and the air baffle 1360 fits over an end of the motor 1350. One or more fasteners extend through the mounting tabs 1376 and through mounting holes in the end of the motor 1350 to maintain the motor 1350 and the air baffle 1360 in engagement with the crank case 1358.

Figure 33:
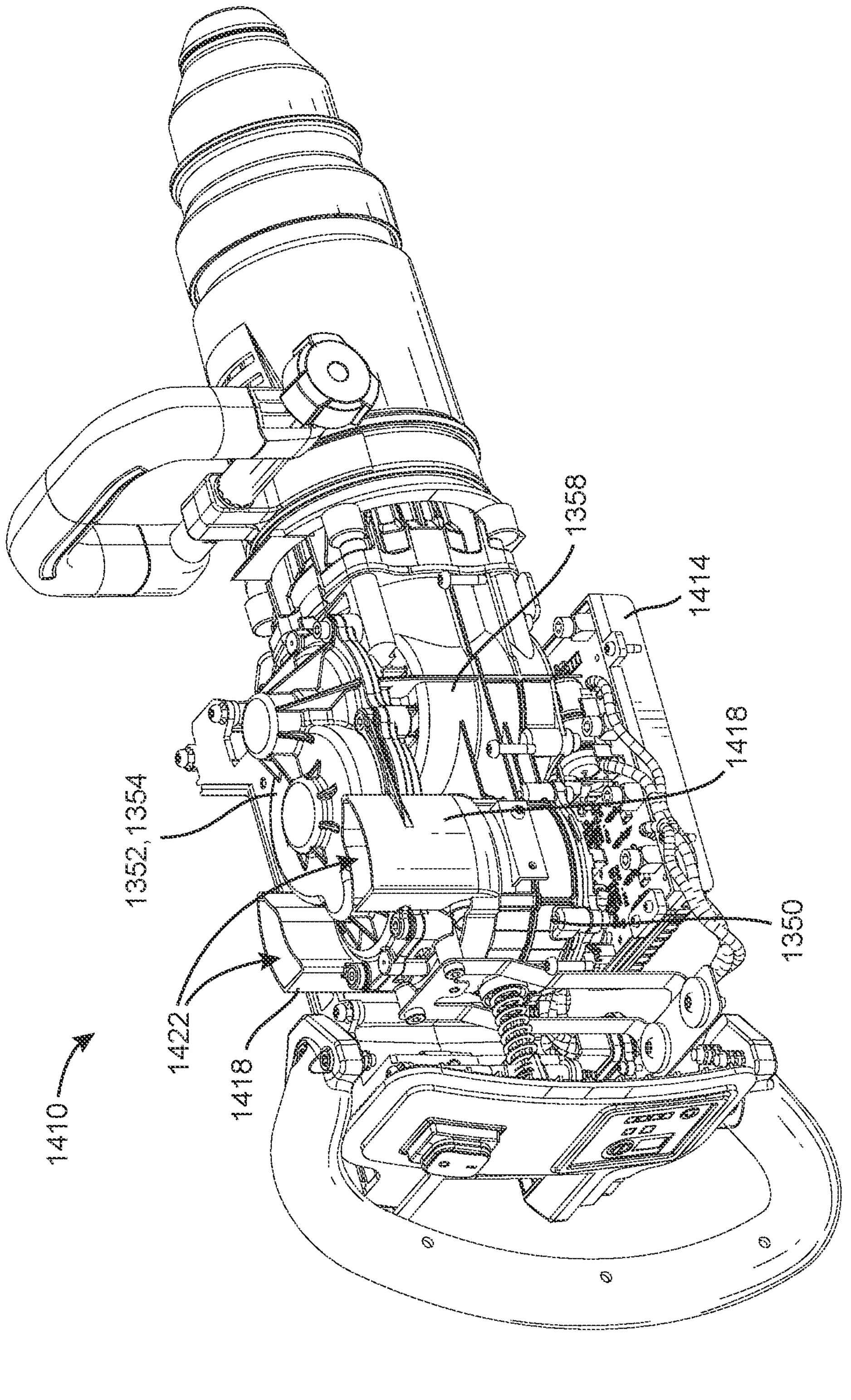
FIG. 33 is a perspective view of a demolition hammer according to another embodiment with portions removed.

FIG. 33 illustrates a demolition hammer 1410 according to another embodiment. The demolition hammer 1410 is similar to the demolition hammer 1310 discussed above with like features being represented with like reference numbers. The demolition hammer 1410 includes the motor 1350, percussion mechanism 1352, and the gear train 1354 described above. The demolition hammer 1410 also includes a controller 1414 that is similar to the controller 1356 described above. Air baffles 1418 are installed between the motor 1350 and a top end 1314 of the housing 1312. Specifically, the air baffles 1418 are coupled to the crank case 1358 on a side opposite the controller 1414. The air baffles 1418 allow fluid communication (i.e., airflow) between the controller 1414 and the motor 1350. Each air baffle 1418 includes an opening 1422 that extends into the interior of the crank case 1358 to allow the airflow to pass and cool the motor 1350 during operation while the fan 1351 is rotating. The openings 1422 are positioned adjacent the inlet vents 1353. During operation, the fan 1351 brings an airflow through the inlet vents 1353 through the interior of the housing 1312 and into the crank case 1358 through the openings 1422 in the air baffles 1418. Additionally, the fan 1351 routes the airflow over the controller 1414 and out of the outlet vents 1355 on the housing 1312. In the illustrated embodiment, the demolition hammer 1410 includes two baffles 1418. In other embodiments, the demolition hammer 1410 may include one baffle or more than two baffles. In further embodiments, the air baffles 1418 may be omitted.

It should be noted that any of the gear trains 46, 1010, 1110, 1210, 1354 discussed above are interchangeable with any of the percussion tools 10, 210, 310, 510, 610, 710, 810, 910, 1310 discussed above. The gear trains being interchangeable allows for the percussion tool to be more compact regardless of the position of the battery pack 26 and the battery receptacle 34 on the housing 14. Further, the percussion tool 10 having a compact configuration allows a center of gravity of the percussion tool 10 to benefit a user during operation of the demolition hammer 10.

Various features of the disclosure are set forth in the following claims.

What is claimed is:

1. A percussion tool comprising:

a housing including a top end, a bottom end, a front end, and a rear end, the housing defining a barrel portion, a handle portion opposite the barrel portion, and a motor housing portion between the barrel portion and the handle portion;

an electric motor positioned within the motor housing portion;

a percussion mechanism driven by the motor and including a striker supported for reciprocation in the housing, the striker defining a striker axis in a reciprocating direction;

a battery receptacle supported by the housing;

a battery pack removably coupled to the battery receptacle for providing power to the motor, the battery pack and the battery receptacle defining a battery axis extending longitudinally through the battery pack and the battery receptacle;

an air baffle including a central opening; and one or more wires extending through the central opening of the air baffle, wherein the striker axis and the battery axis are parallel.

2. The percussion tool of claim 1, wherein the battery receptacle is positioned on a side of the housing between the front end and the rear end.

3. The percussion tool of claim 2, wherein the battery axis is offset from the striker axis.

4. The percussion tool of claim 1, wherein the battery receptacle is positioned on the top end of the housing adjacent the motor housing portion.

5. The percussion tool of claim 1, wherein the battery receptacle is positioned on the bottom end of the housing adjacent the motor housing portion.

6. The percussion tool of claim 1, wherein the battery receptacle is positioned on the bottom end of the housing adjacent the barrel portion.

7. The percussion tool of claim 1, further comprising a controller supported within the housing.

8. The percussion tool of claim 7, wherein the controller is positioned on a side of the housing adjacent the battery receptacle.

9. The percussion tool of claim 7, wherein the controller is positioned on a side of the housing opposite the battery receptacle.

10. The percussion tool of claim 1, further comprising a crank case within the housing supporting the motor and the percussion mechanism.

11. The percussion tool of claim 10, further comprising a spring positioned between the crank case and the housing to attenuate vibration of the crank case relative to the housing.

12. The percussion tool of claim 10, wherein the air baffle is coupled to the crank case to direct air flow to the motor.

13. The percussion tool of claim 12, further comprising a fan driven by the motor, wherein the air baffle includes an opening that extends into an interior of the crank case to allow the air flow to pass and cool the motor while the fan is rotating, and wherein the opening is positioned proximate an inlet vent in the housing.

14. A percussion tool comprising:

a housing;

an electric motor positioned within the housing;

a percussion mechanism driven by the motor and including a striker supported for reciprocation in the housing, the striker defining a striker axis in a reciprocating direction;

a battery receptacle supported by the housing;

a battery pack removably coupled to the battery receptacle for providing power to the motor;

a controller operably coupled with the electric motor;

an air baffle disposed between the controller and the electric motor, the air baffle including a central opening; and one or more wires extending through the central opening of the air baffle, wherein the air baffle directs air flow between the controller and the electric motor.

15. The percussion tool of claim 14, wherein the air baffle is disposed on an end of the electric motor adjacent the controller.

16. The percussion tool of claim 14, wherein the air baffle includes a hollow base having an end plate and a cylindrical sidewall extending from the end plate, and wherein the cylindrical sidewall fits over an end of the motor.

17. The percussion tool of claim 16, wherein the air baffle further includes an air exchange opening formed in the end plate adjacent the sidewall.

18. The percussion tool of claim 17, wherein the end plate of the air baffle has a total area A1 and the air exchange opening extends over an area A2 that is greater than or equal to 0.100 times A1.

19. The percussion tool of claim 18, wherein the area A2 is less than or equal to 0.200 times A1.

20. The percussion tool of claim 17, wherein the air baffle further includes an air director that extends from the sidewall adjacent the air exchange opening.

21. The percussion tool of claim 20, wherein the air director extends partially along a perimeter of the sidewall over an angle A, and wherein the angle A is greater than or equal to 90 degrees.

22. The percussion tool of claim 21, wherein the angle A is less than or equal to 130 degrees.

23. The percussion tool of claim 20, wherein the air baffle has a height H1 measured through the base and a height H2 measured through the air director, and wherein the height H2 is greater than the height H1.

24. The percussion tool of claim 23, wherein the height H2 is greater than or equal to 1.8 times H1.

25. The percussion tool of claim 24, wherein the height H2 is less than or equal to 2.7 times H1.

* * * * *